United States Patent
Fitzpatrick et al.

(10) Patent No.: US 6,403,899 B1
(45) Date of Patent: Jun. 11, 2002

(54) VEHICLE FOG LAMP INTERLOCK SWITCH APPARATUS

(75) Inventors: Dennis J. Fitzpatrick, Orion Township; Allen K. Schwartz, Oxford; David Glowczewski, Washington, all of MI (US)

(73) Assignee: Valeo Electrical Systems, Inc., Auburn Hills, MI (US)

(*) Notice: Subject to any disclaimer, the term of this patent is extended or adjusted under 35 U.S.C. 154(b) by 0 days.

(21) Appl. No.: 09/533,718

(22) Filed: Mar. 23, 2000

(51) Int. Cl.$^7$ ................................................. H01H 9/00
(52) U.S. Cl. ................................ 200/61.54; 200/61.27
(58) Field of Search .................. 200/4, 17 R, 61.27, 200/61.54, 332, 335

(56) References Cited

U.S. PATENT DOCUMENTS

| | | | |
|---|---|---|---|
| 3,209,092 A | 9/1965 | Vitaloni et al. | 200/61.34 |
| 3,459,913 A | 8/1969 | Mutschler et al. | 200/166 |
| 3,476,896 A | 11/1969 | Schreiber | 200/61.54 |
| 3,719,787 A | 3/1973 | Tomecek | 200/61.27 |
| 3,766,351 A | 10/1973 | Cryer | 200/18 |
| 3,793,491 A | 2/1974 | Cryer | 200/18 |
| 3,892,932 A | 7/1975 | Erdelitsch et al. | 200/61.27 |
| 3,934,101 A | 1/1976 | Jones | 200/5 B |
| 3,940,579 A | 2/1976 | Buhl et al. | 200/4 |
| 4,072,840 A | 2/1978 | Daigle | 200/296 |
| 4,219,706 A | 8/1980 | Koch et al. | 200/4 |
| 4,219,709 A | 8/1980 | Scarbro | 200/61.54 |
| 4,277,658 A | 7/1981 | Delp et al. | 200/335 |
| 4,291,213 A | 9/1981 | Felland et al. | 200/335 |
| 4,376,236 A | 3/1983 | Long | 200/61.27 |
| 4,379,954 A | 4/1983 | Iwata et al. | 200/4 |
| 4,387,279 A | 6/1983 | Brevick | 200/61.54 |
| 4,404,438 A | 9/1983 | Honjo | 200/61.54 |
| 4,543,848 A | 10/1985 | Beauch | 74/493 |
| 4,617,437 A | 10/1986 | DuRocher | 200/153 P |
| 4,648,728 A | 3/1987 | Erdelitsch et al. | 384/537 |
| 4,678,875 A | 7/1987 | Erdelitsch et al. | 200/61.54 |
| 4,723,057 A | 2/1988 | Lane, Jr. | 200/61.27 |
| 4,739,130 A | 4/1988 | Roller et al. | 200/61.27 |
| 4,810,839 A | 3/1989 | Chretier | 200/4 |
| 4,849,585 A | 7/1989 | Vidican et al. | 200/61.54 |
| 4,857,815 A | 8/1989 | Erdelitsch et al. | 318/443 |
| 5,003,132 A | 3/1991 | Lagier | 200/4 |
| 5,049,706 A | 9/1991 | DeRocher | 200/61.54 |
| 5,272,290 A | * 12/1993 | Suzuki et al. | 200/4 |
| 5,281,779 A | 1/1994 | Bogovican et al. | 200/5 R |
| 5,430,265 A | 7/1995 | Beattie | 200/61.54 |
| 5,453,588 A | 9/1995 | DuRocher et al. | 200/61.54 |
| 5,473,809 A | 12/1995 | DuRocher | 29/622 |
| 5,610,378 A | 3/1997 | DuRocher et al. | 200/61.54 |
| 5,724,719 A | 3/1998 | DuRocher et al. | 29/622 |
| 5,742,014 A | 4/1998 | Schwartz et al. | 200/61.27 |
| 5,780,794 A | * 7/1998 | Uchiyama et al. | 200/61.54 |
| 5,852,867 A | 12/1998 | DuRocher | 29/622 |
| 5,923,006 A | * 7/1999 | Nakamura | 200/5 B |
| 5,939,686 A | * 8/1999 | Bellach et al. | 200/61.54 |
| 5,959,268 A | * 9/1999 | Hirschfeld | 200/5 B |

FOREIGN PATENT DOCUMENTS

| | | | |
|---|---|---|---|
| EP | 0248716 | 12/1987 | B60Q/1/14 |
| EP | 0366628 | 5/1990 | B60Q/1/42 |
| GB | 1359477 | 7/1974 | B60Q/1/42 |
| GB | 1514737 | 6/1978 | B60Q/1/42 |
| GB | 2018027 | 10/1979 | H01H/25/00 |
| GB | 1570337 | 6/1980 | B60Q/1/42 |
| GB | 2135126 | 8/1984 | H01H/25/00 |

* cited by examiner

*Primary Examiner*—Michael Friedhofer
(74) *Attorney, Agent, or Firm*—J. Gordon Lewis

(57) ABSTRACT

A circuit interlock switch mountable in a stalk switch apparatus includes an actuator mounted on a lever movably mounted in a housing attachable to a vehicle steering column. The actuator is moveable relative to the lever. In a first movement state, the actuator is coupled through a shaft extending through the lever to a contactor and moves the contactor between operative states upon rotation of the actuator to open and close vehicle circuits coupled through conductive traces in a substrate engaged by contacts on the contactor. A cam and cam follower are formed on the lever and the actuator to permit axial translation of the actuator relative to the lever only in certain rotated positions of the actuator.

18 Claims, 15 Drawing Sheets

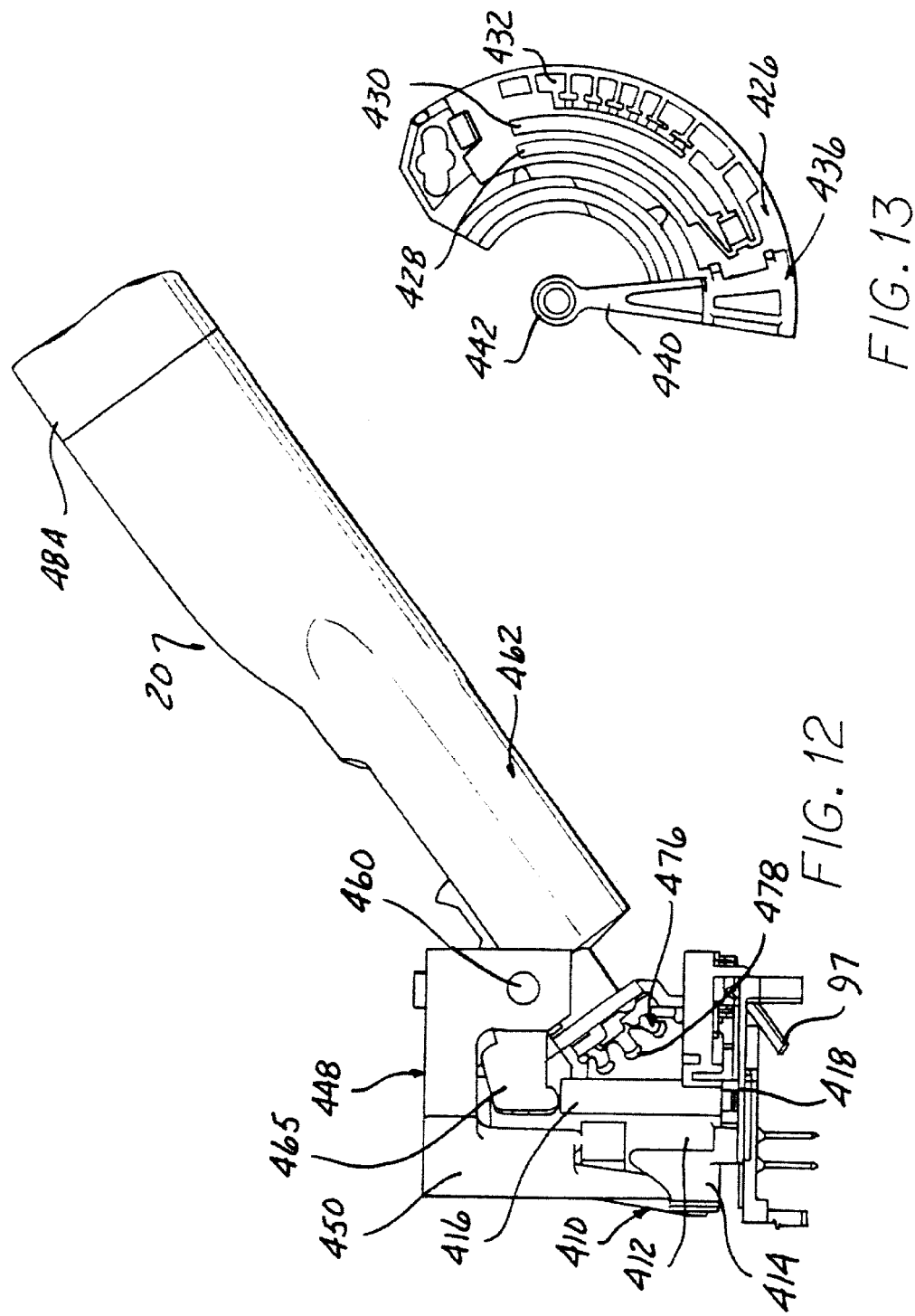

VEHICLE FOG LAMP INTERLOCK SWITCH APPARATUS

CROSS-REFERENCE TO RELATED APPLICATIONS

This application is related to three other co-pending applications, U.S. patent application Ser. No. 09/533,716 for "MULTI-FUNCTION SWITCH APPARATUS" and Ser. No. 09/533,681 for "MULTI-FUNCTION STOCK SWITCH WITH ZERO BACKLASH DRIVE GEAR PAIR" and Ser. No. 09/534,426 for "SWITCH APPARATUS FOR ACTUALIZING A PLURALITY OF ELECTRICAL CIRCUITS", all filed on Mar. 23, 2000.

BACKGROUND OF THE INVENTION

1 Field of the Invention

The present invention relates to switches and, more specifically, to vehicle steering column mounted switches for controlling vehicle operating circuits and components.

2 State of the Art

The evolution of steering column switches in motor vehicles has been toward greater integration of functions in a single switch lever. Previously, a plurality of individual switches, each controlling a single vehicle function, i.e., turnsignals, windshield wipers, headlights, etc., were mounted on the vehicle dashboard. Current steering column switch levers are designed to control a variety of functions for vehicle operating circuits or devices, such as turnsignals and hazard lights, high beam and low beam headlights with optional flash-to-pass, parking lights, fog lights, windshield wiper and wash functions, including multi-speed wipers with or without intermittent delay.

Typically, a steering column stalk switch includes a single lever or stalk pivotally mounted on one side of a housing attached to the vehicle steering column in an easily accessible position for access by the driver of the vehicle. The lever is gimballed at one end in housing so as to move in one and, typically, two mutually separate planes. Further, the lever may be provided with a rotatable end cap, and/or a slidable member movable along the longitudinal axis of the lever to control additional vehicle operating circuits. An intermediate member on the lever may also be rotatable to control another vehicle circuit or device. Actuators are mounted in the housing and, in response to movement of the lever in different directions or planes, rotation of the end cap, or movement of the slidable member, or rotation of the intermediate member on the lever, move a switching member carrying contacts between various switching positions to effect the switching of electrical connections for a particular vehicle operating circuit.

In some vehicles, particularly vehicles manufactured in Europe and/or Japan, two steering column stalk switches are provided, one mounted on the left side of the steering column and one on the right side of the steering column. The various vehicle operating circuits or devices described above are split between the two stalk switches, with the left stalk switch typically controlling vehicle headlight, parking light, fog light, flash-to-pass operation as well as turnsignal operations. The right mounted stalk lever typically controls windshield wiper, mist and wash devices.

However, regardless of whether one or two stalk switches are employed in a vehicle, vehicle design constraints require that the stalk switch lever and the housing assembly be as small as possible while at the same time providing easy access to and movement of the various switches on the stalk switch(es). At the same time, each stalk switch must meet further design constraints relating to a low manufacturing cost, a minimal number of individual components, ease of assembly, and ease of installation in the vehicle. Such stalk switches must also have the capability of easy modification to different vehicle design parameters, such as the ability to control when the vehicle fog lights are operable with respect to the state of the vehicle high beam or low beam headlights. It would also be desirable to provide a vehicle mounted steering column stalk switch which is capable of three modes or degrees of motion, namely, radially, axial and gear driven to operate a plurality of electrical circuits in the vehicle. It would also be desirable to provide a vehicle mounted steering column stalk switch which has the capability of operating a plurality of auxiliary circuits in a single stalk switch lever.

SUMMARY OF THE INVENTION

A vehicle steering column stalk switch apparatus constructed in accordance with the present invention includes a unique fog lamp interlock switch which limits the ability of a vehicle operator to switch on the vehicle front and/or rear fog lamps to only certain operative states of the vehicle headlamps.

In one aspect of the invention, a housing is mounted on a vehicle steering column and has a lever mounted thereon. A first contractor is mounted in the housing for movement between distinct positions and carries contacts electrically connectable to conductive elements in the housing which are connected to a first set of vehicle operating circuits.

A first actuator is rotatably mounted on the lever for movement independent of the lever. A second contractor is mounted in the housing and is selectively movable into contact with conductive elements carried in the housing for controlling operation of a second vehicle operating circuit. Means cooperate between the first actuator and the second contractor for permitting movement of the second contractor from a first position to a second position only in predetermined positions of the first actuator. In the second position, the second contractor engages contacts with selected conductive elements or traces in the housing to turn on the second vehicle operating circuit.

In one preferred aspect, the first actuator is in the form of an end cap movably coupled to the lever for rotation with respect to the lever. A shaft extends through the lever and has a first end fixed to the end cap and an opposed second end engagably coupled to the first contractor for controlling the first set of vehicle operating circuits such that rotation of the end cap and the shaft causes movement of the first contractor between positions.

A cam is formed in the lever and defines the rotated positions of the actuator where the actuator is allowed to move to the second position. A cam follower is carried on the shaft and movable along the cam. The cam is formed to allow axial translation of the end cap with respect to the lever only in certain rotated positions of the end cap with respect to the lever.

Different cams may provided which allow the end cap to be linearly movable relative to the lever when the end cap has been rotated to a first position in which the first actuator and first contractor complete a circuit to turn the vehicle park lights on, and/or to a second position in which the end cap is rotated to a position in which the first actuator and first contractor complete a electrical circuit to turn on the vehicle low beam and/or high beam headlamps.

The cam may also provide for separate actuation of rear vehicle fog lamps only after front mounted vehicle fog lamps have been activated by further rotation of the end cap from its translated position with respect to the lever.

According to one aspect of the present invention, all of the electrical contacts necessary to open and close circuits controlling the state of the operating circuits for the vehicle headlamps as well as the vehicle fog lamps, for example, are mounted on a single contractor which is moved between separate positions opening and closing various electrical circuits in response to rotation of the end cap relative to the lever as well as linear translation of the end cap with respect to the lever as described above.

According to another aspect of the present invention, a detent surface with a plurality of discrete detents is formed in a tubular member mounted about the shaft concentric within the lever. The cam follower is in the form of a plunger mounted on the shaft and rotatably engagable with the detents to define the distinct rotated positions of the end cap relative to the lever.

The detents extend axially on an inner surface of the tubular member. A radially inward step is formed in each detent surface to provide tactile feel for axial translation of the end cap relative to the lever.

The plunger also acts as the cam follower and rides along the cam to define the axially translated positions of the end cap relative to certain rotated positions of the end cap or actuator.

The present vehicle fog lamp interlock switch mountable in a vehicle steering column stalk switch lever uniquely provides a steering column switch apparatus with the capability to switch a moving contractor which is driven by rotation of an actuator mounted on a lever through a first group of operative states opening and closing electrical circuits via connection of an electrical contact on the contractor with conductive traces on the substrate to additionally open and close a separate circuit via a separate contact carried on the contractor through a separate movement of the actuator with respect to the lever. This provides multiple functions on a single vehicle stalk switch lever thereby affording the advantages of a small compact lever, simplified installation due to the combination of multiple control devices in a single lever, as well as a lower manufacturing cost due to the use of a reduced number of separate components.

BRIEF DESCRIPTION OF THE DRAWING

The various features, advantages and other uses of the present invention will become more apparent by referring to the following detailed description and drawing in which:

FIG. 12 is a side elevational view of the wiper switch shown in FIG. 3D;

FIG. 13 is a bottom elevational view of the radial rack and printed circuit board of the wiper switch shown in FIGS. 3D and 10–12;

DESCRIPTION OF THE PREFERRED EMBODIMENTS

Figure 1:
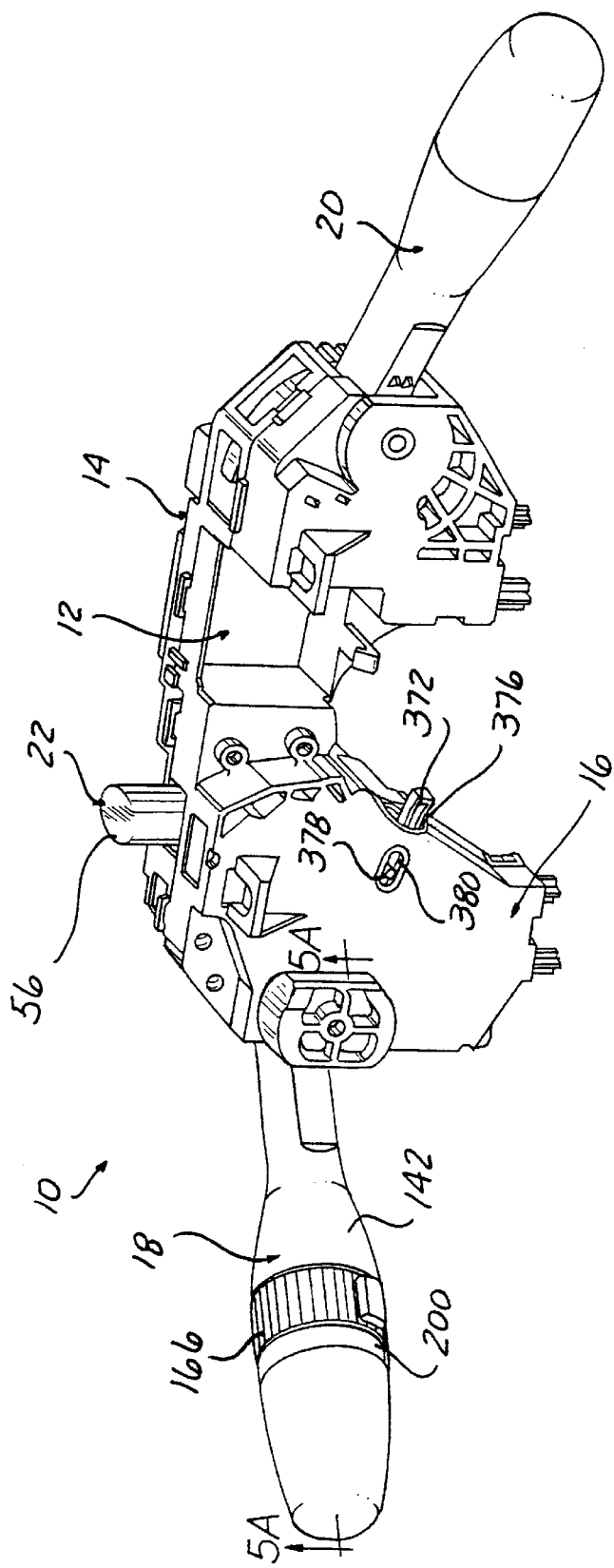
FIG. 1 is a perspective view of a steering column stalk switch apparatus according to the present invention.

Referring now to the drawing, and to FIGS. 1–14 in particular, there is depicted a steering column stalk switch apparatus 10 which is mountable on a vehicle steering column, not shown, and operative to control the vehicle exterior lighting, windshield wiper and windshield wash functions and hazard flash functions, and to control of the intensity or brightness of the interior instrument panel back lighting.

The steering column stalk switch apparatus, hereafter referred to as the "switch apparatus", includes a housing assembly 12 formed of a back housing 14 and a front cover 16 which is interlockingly engagable with the back housing 16 and mountable by conventional means to a vehicle steering column, a headlamp/turnsignal lever assembly 18, a windshield wiper/wash/mist lever assembly 20 and a hazard flasher denoted generally by reference number 22.

The back housing 14 is formed as a one-piece, molded plastic member having a bottom wall 32 with a stepped configuration and upstanding side walls 34 extending from various peripheral edges of the bottom wall 32 and forming cavities on the back housing 14 for receiving various control elements, as described hereafter.

As generally shown in FIGS. 1, 2, 3A and 4, the back housing 14 includes a first cavity 36 containing a headlamp contact grid 38 insert molded in the bottom wall 32 and an adjacent portion 40 containing apertures for receiving terminals of a headlamp beam change grid described hereafter.

Adjacent to the first cavity 36 are mounting flanges 44 which receive a hazard carrier 46 forming part of the hazard flasher 22. The hazard carrier 46 is movably biased relative to the back housing 14 by a plunger 48 and a biasing spring 50 which seat in a tubular member 52 extending from the bottom wall 32 of the back housing 14. A bifurcated leaf contact 54 is heat staked to mounting pins on the hazard carrier 46. Contact ends of the leaf contact 54 are adapted to engage a contact grid mounted on a printed circuit board which carries a flasher relay as is conventional. Movement of a hazard carrier button 56 and the entire hazard carrier 46 causes the leaf contact 54 to complete an electrical circuit between various contacts or conductive traces on the relay printed circuit board thereby providing an output signal to a hazard sense contact 58 which is mounted in recesses in the bottom wall 32 of the back housing 14. The hazard sense contact 58 terminates in a bridge 60 formed of a plurality of opposed resilient contact arms which define a slot therebetween.

Figure 3A:
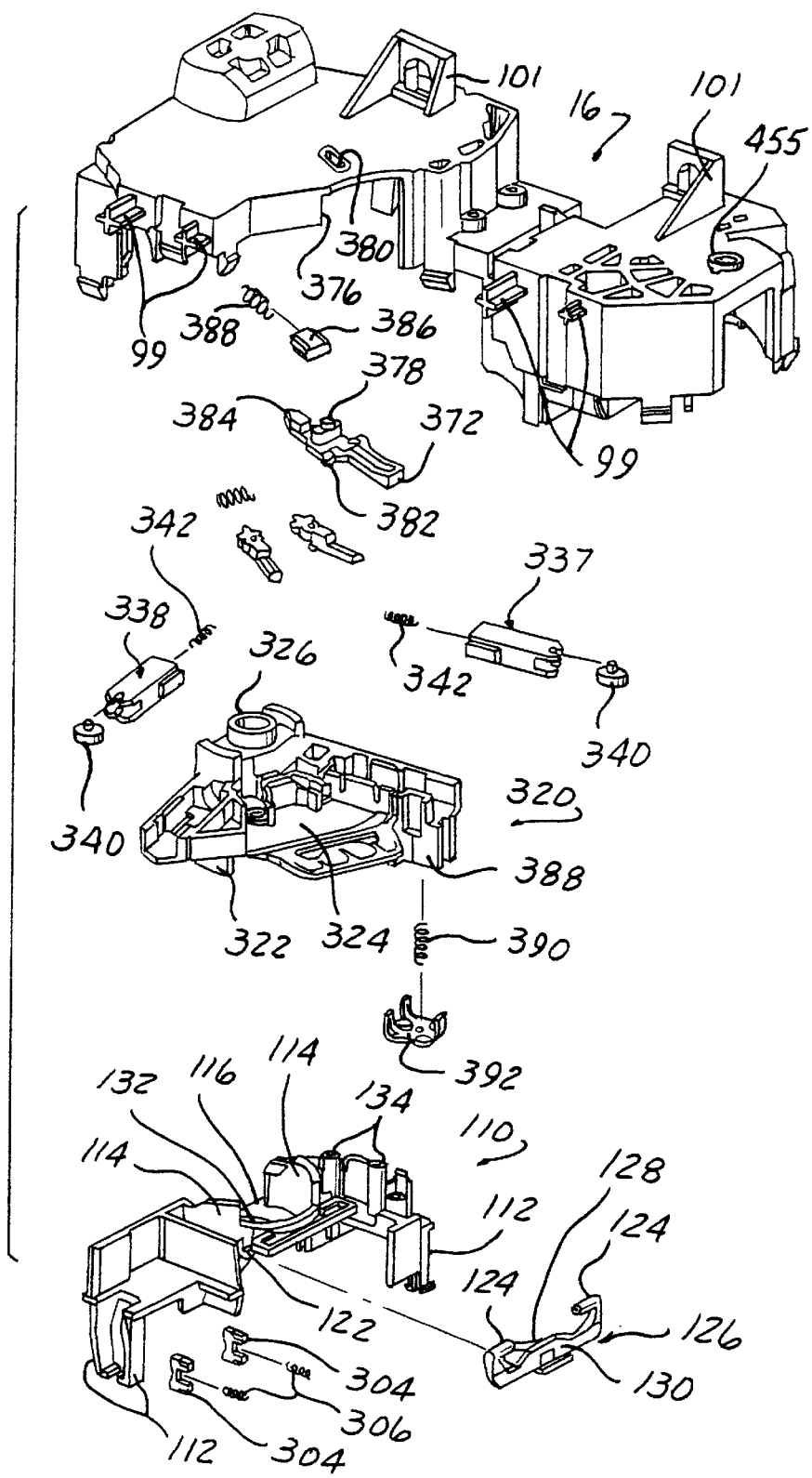
FIGS. 3A and 3B are exploded perspective views of the housing portion of the stalk switch apparatus shown in FIG. 1.
Figure 3B:
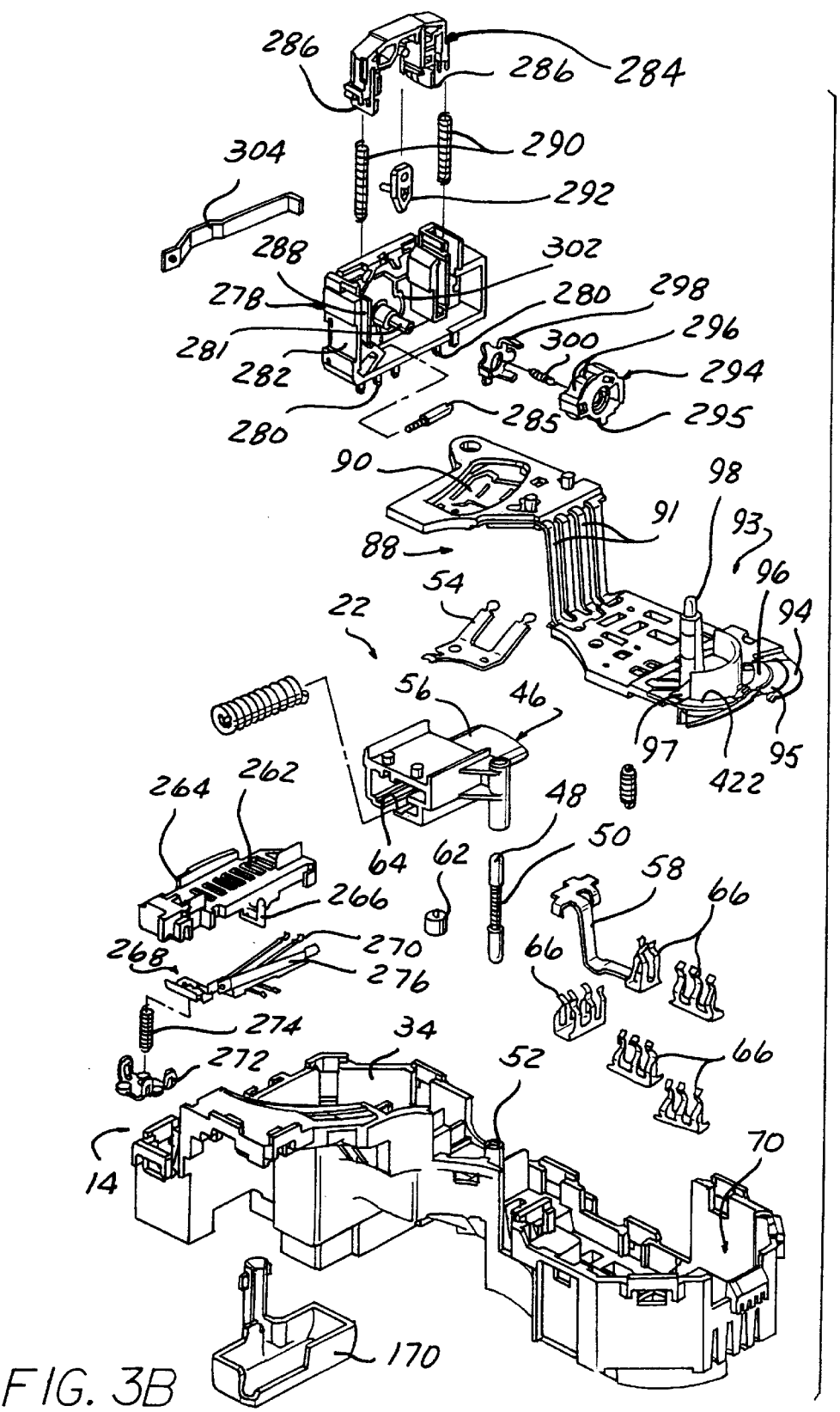

A latch pin 62 rides in a slot 64 seen in FIG. 3B in the hazard carrier 46 to control latching of the hazard carrier 46 in the depressed position and unlatching upon subsequent depression of the hazard button 56 in a conventional manner.

Figure 4:
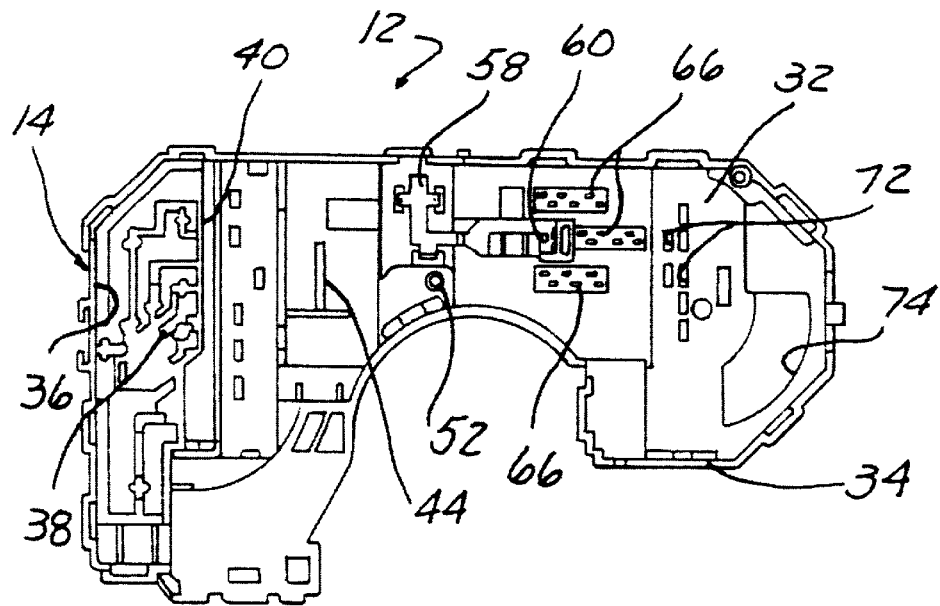
FIG. 4 is a plan elevational view of the back housing shown in FIGS. 1–3A.

As also shown in FIG. 4, a plurality of additional recesses are formed in a generally central portion of the back housing 14 to receive additional clip bridges 66, each in the form of a unitary electrically conductive member having at least one pair and preferably a plurality of pairs of spaced resilient arms, each pair or groups defining a single slot therebetween for receiving a terminal. The rightmost end portion of the back housing 14, in the typical driver orientation shown in FIG. 4, includes a plurality of terminal receiving apertures 72 and a generally arcuate recess 74.

Figure 2:
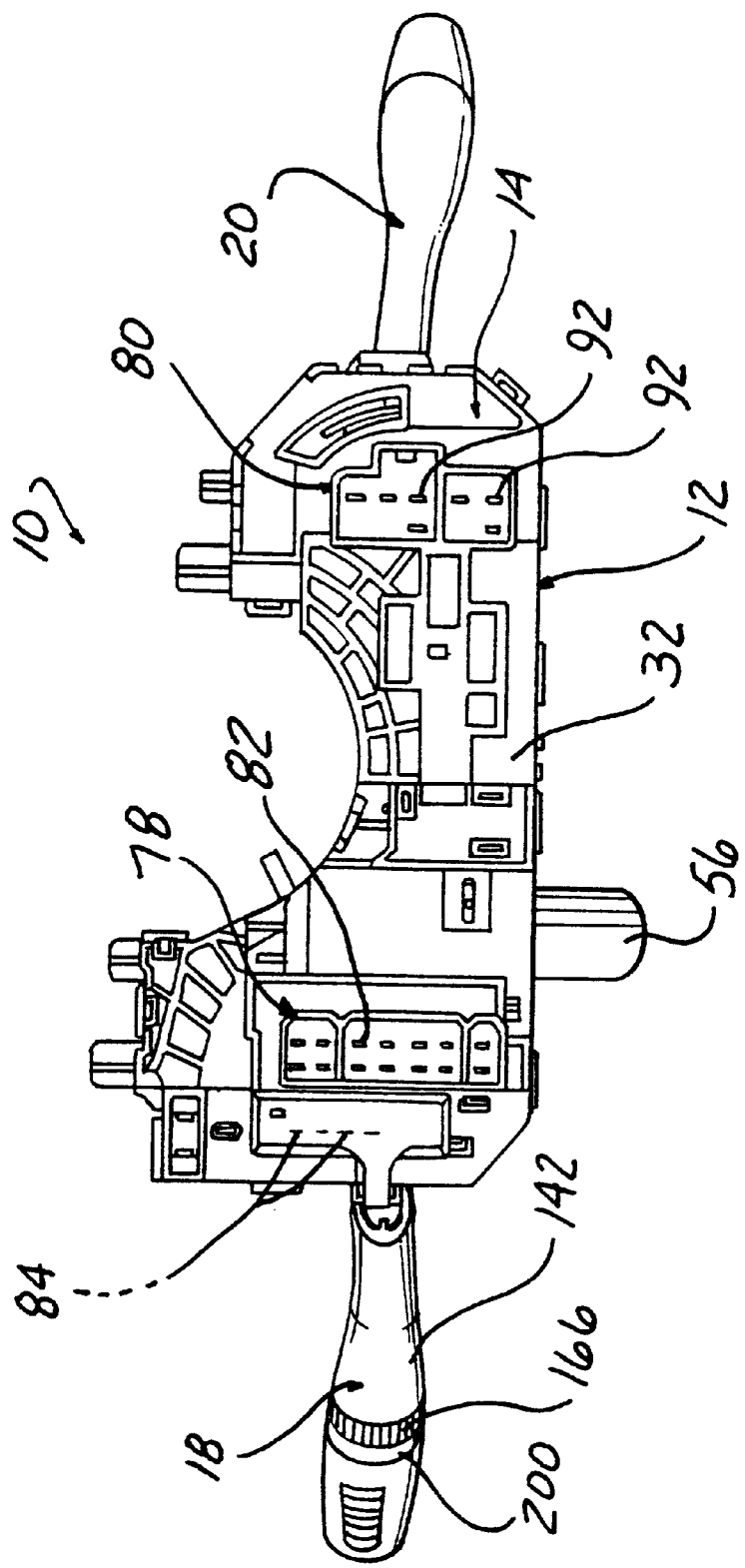
FIG. 2 is a bottom elevational view of the apparatus of FIG. 1 shown in an assembled state.

As shown in FIG. 2, first and second connector receptacles 78 and 80, respectively, are formed on and extend from the bottom wall 32 of the back housing 14. Each receptacle 78 and 80 includes apertures for receiving terminals therethrough from various components mounted in the back housing 14 as described hereafter. In addition, a plurality of terminals 82 are formed in the first connector receptacle 78. The terminals 82 are connected to various traces in the headlamp contact grid 38. Two additional terminals 84, also connected to portions of the headlamp grid 38, are located adjacent to the first connector receptacle 78. In this manner, a plurality of individual connectors from the vehicle body wiring harness may be easily interconnected to the terminals in the back housing 14 for connection of the various components of the switch apparatus 10 to the vehicle electrical system for control of specified vehicle components as described hereafter.

As shown in FIGS. 1 and 4, a one piece grid assembly 88 has a first contact grid 90 insert molded in a rigid insulating carrier or body. Leads 91 extend from the contact grid 90 to terminals 92 projecting exteriorly of the bottom wall 32. Another grid assembly 91 including conductive traces is insert molded in another portion of the grid assembly 88.

Figure 10:
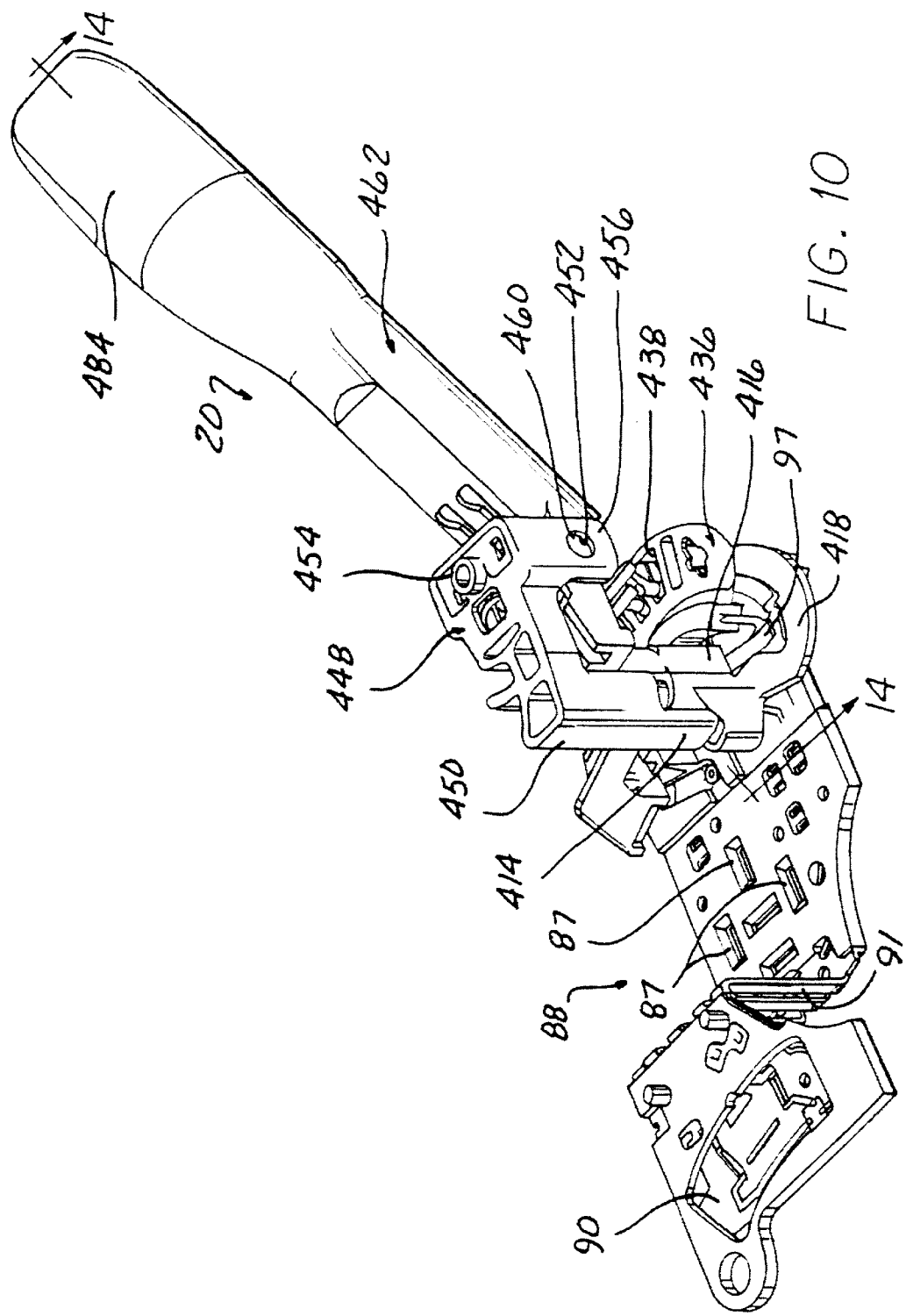
FIG. 10 is a top perspective view of the wiper switch mounted on the grid assembly.
Figure 11:
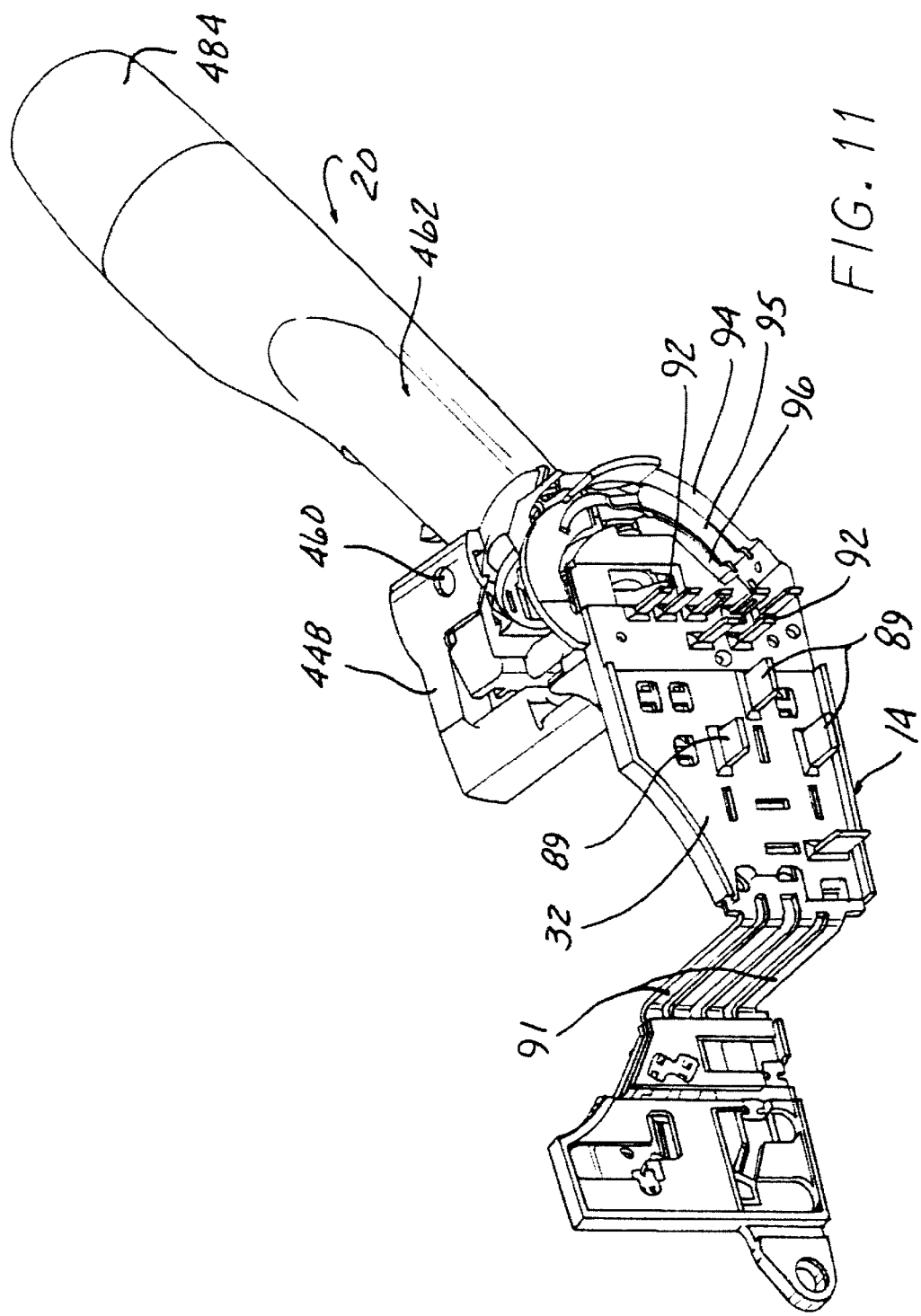
FIG. 11 is a bottom perspective view of the wiper switch mounted on the grid assembly.

The grid assembly 88 has terminals 89 extending from apertures 87, shown in FIGS. 10 and 11 which engage the clip bridges 66 to electrically connect the hazard carrier 46 to the conductive contact grid 90 and, then, to the terminals 92 in the receptacle 80. The terminals 89 assist in mounting the grid assembly 88 as a part of the back housing 14.

Also forming a part of the grid assembly 91 is a contact grid 93 designated for windshield wiper/mist/wash operation, as described hereafter. The second contact grid 93 includes individual leaf contacts 94, 95, 96 and 97. A further description of the operation of the leaf contacts 94–97 will be provided hereafter in conjunction with a description of the windshield wiper/wash lever 20.

Finally, a post 98 extends from one end of the carrier bodies of the grid assembly 88 and receives the wash/mist actuator as described hereafter.

The front cover 16, as shown in FIGS. 1 and 3A, is also formed of a one-piece, molded plastic body having a shape complementary to the shape of the back housing 14. The front cover 16 provides pivot connections to the headlamp/ turnsignal lever 18 and the windshield wiper/wash lever 20 as described hereafter. Keyed posts 99 project from one edge of the front cover for orienting the front cover 16 on the steering column when inserted into mating slots in a steering column mounting bracket. Mounting flanges 101 also project from the front cover 16 for alignment with apertures in the steering column mounting bracket, not shown. Additional features of the front cover 16 will be described in connection with the various operative elements of the switch apparatus 10 with which such features interact.

Referring now to FIGS. 1, 3A, 3B, and 4–7, the detailed construction of the headlamp/turnsignal lever 18 will now be provided. A turn carrier base 110 is mountable by means of opposed pairs of latch arms 112 into apertures in the bottom wall 32 of the back housing 14 generally located in the first cavity and adjacent portions 36 and 40. The turn carrier base 110 includes a pair of arcuate walls 114 which project upwardly from a support wall 116. The arcuate walls 114 and the support wall 116 support a pair of depending legs 322, only one of which is shown in FIG. 3A on a turnsignal carrier 320. The legs 118 slidably rest on the support wall 116 and are disposed adjacent to the arcuate walls 114 to provide pivotal movement of the turnsignal carrier 320 between a center neutral position and opposed left turn and right turn positions.

A pair of recesses 122, only one of which is shown in FIG. 3A, are disposed adjacent to the arcuate walls 114 and receive opposed pivots 124 on a fog lamp lever 126. The pivots 124 pivotally mount the fog lamp lever 126 to the turn carrier base 110. The fog lamp lever 126 has a centrally located pad 128 depending from a center leg portion 130. When the fog lamp lever 126 is pivotally mounted in the recesses 122 in the turn carrier base 110, the pad 128 is disposed within an aperture 132 in the support wall 116 of the turn carrier base 110 so as to be accessible through the aperture 132 to movement of the end of a shaft extending through the lever 18 as described hereafter.

Hollow posts 134 are also formed along one end of the turn carrier base 110 for receiving interconnecting pins depending from the front cover 16 to position the turn carrier base 110 relative to the front cover 16.

The turnsignal carrier 320, which will be described in greater detail hereafter in conjunction with operation of the headlamp/turnsignal lever 18 for operation of the vehicle turnsignals, is preferably in the form of a one-piece, molded plastic body which includes a tubular sleeve 326 mounted in a leg extending between an upper portion of the depending legs 118. The sleeve 326 receives a lever plunger 136 shown in FIG. 3C having a spherical endform which is seated in one end of the sleeve 326. A projection, not shown, depends from the front cover 16 into the other end of the sleeve 326 to pivotally mount the turnsignal carrier 120 in the housing 12.

The lever plunger 136 is biased into the sleeve 326 by a biasing member or spring 140 which seats in a tubular sleeve 141 formed at one end of a hollow lever 142. The lever 142 is preferably in the form of a one-piece, unitary, molded plastic body having a pair of transversely extending trunnions 144, only one being shown in FIG. 3C, which pivotally seat within apertures formed in the depending legs 118 on the turnsignal carrier 320. When the trunnions 144 are mounted in the apertures in the depending legs 118, the sleeve 141 is generally coaxially aligned with the sleeve 326 on the turnsignal carrier 320. In this manner, the headlamp turnsignal lever 142 is pivotally mounted for rotation in two angularly disposed planes. Preferably, the lever 142 is mounted for pivotal movement in two perpendicular opposed planes about a first axis extending between the trunnions 144 and a second axis extending through the sleeve 141, the lever plunger 326 and the sleeve 134 on the turnsignal carrier 320.

Figure 3C:
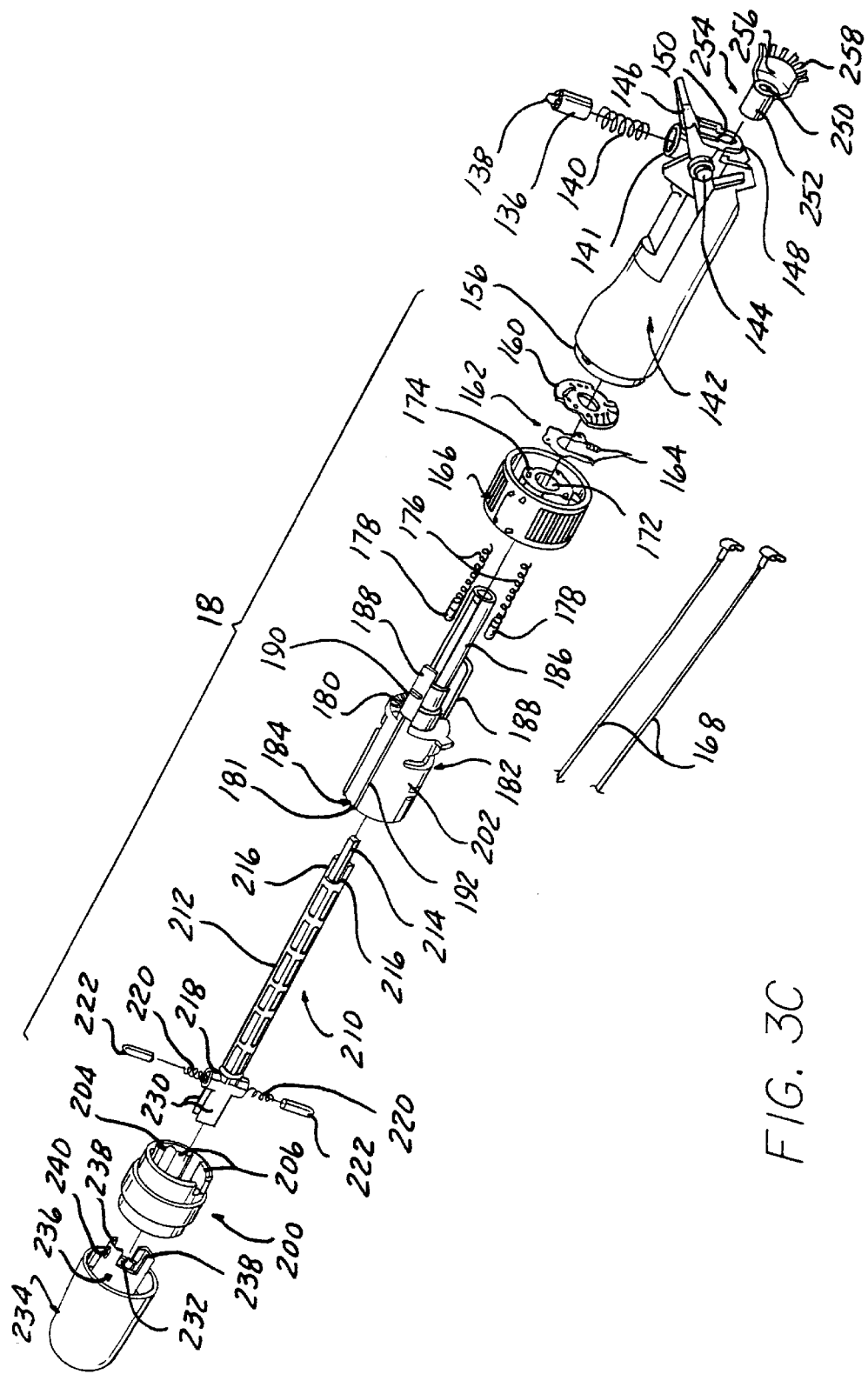
FIG. 3C is an exploded perspective view of the headlight/turnsignal stalk switch lever shown in FIG. 1.

As also shown in FIG. 3C, the lever 142 is provided with a flash-to-pass paddle 146 which projects angularly from one end of the lever 142. In addition, a mounting arm 148 with a through slot 150 depends from one end of the lever 142 generally below the paddle 146. The mounting slot 150 is coaxially aligned with a through bore extending through the lever 142 from one end adjacent to the mounting arm 148 and an opposed end forming a seat generally spaced from an opposed exterior end 156 of the lever 142.

Figure 5A:
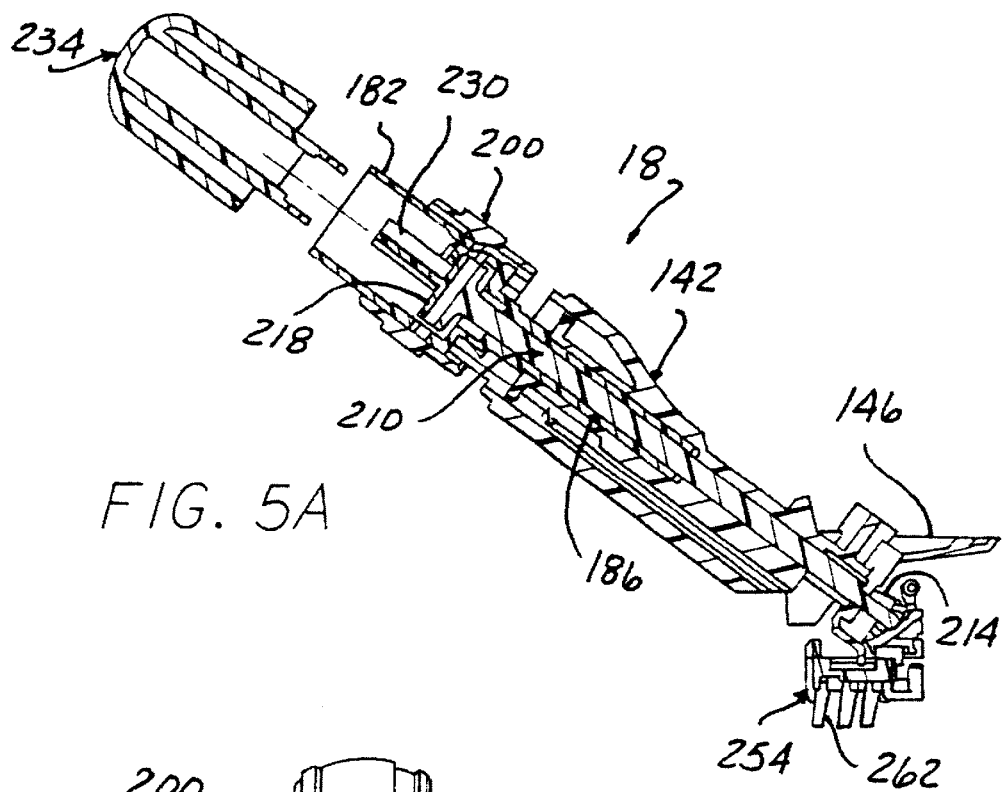
FIG. 5A is a longitudinal cross section view generally taken along line 5A—5A of FIG. 1.
Figure 5B:
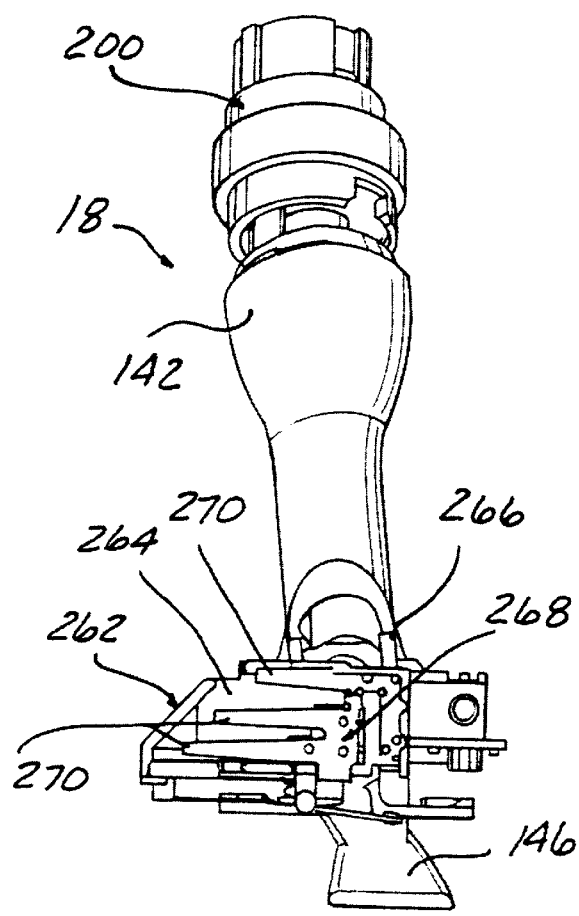
FIG. 5B is a bottom perspective view of the headlight/turn signal lever engaged with the linear rack.

As shown in FIGS. 3C, 5A and 5B, a printed circuit board 160 carrying conductive traces individually connected to a series of circumferentially spaced resistors is mounted on the seat within the end 156 of the lever 142. A leaf contact 162 having a pair of leaf contact pads 164 mounted at the end of two spaced arms, is fixedly mounted, such as by heat staking, in one end of an instrument panel lamp dimmer ring 166. Rotation of the dimmer ring 166 causes the contact arms 164 to wipe across the conductive traces on the circuit board 160 thereby varying the amount of resistance supplied to the instrument panel lamp circuit. A pair of wires 168 are connected, such as by soldering, to the circuit board 160 at one end and pass through the first end of the lever 142 exteriorly of the back housing 14 to the two additional terminals 84 on the exterior surface of the bottom wall 32 of the back housing 14. Terminal connections on the end of the wires 168 connect to terminals 84 which are in turn connected via conductive traces on the grid assembly 88 to selected first connector terminals 82. The wires 168 are protected by a cover 170, shown in FIG. 3B which snaps on the exterior surface of the back housing 14.

A through bore 172 is formed internally within the dimmer ring 166 in a solid central member 174 mounted or formed within the outer periphery of the dimmer ring 166. The outer periphery of the dimmer ring 166 may be formed with surface gradations, such as spaced projections, providing an easily rotatable finger engagement surface.

The opposed end of the central member 174 is provided with at least one and, preferably, a pair of spring seats which receive biasing springs 176. A plunger 178 is mounted at the opposite end of each spring 176. At least one of the plungers 178 rides against an arcuate detent surface 180 formed on one end of an intermediate housing 182. The other plunger 178 rides on a smooth end portion of the housing 182. Two diametrically opposed plungers 178 are preferably employed, even through only one plunger 178 engages the detent surface 180, for force equalization during rotation of the dimmer ring 166. The intermediate housing 182 is characterized by a generally cylindrical portion having the one end 180 and an opposed end 184. A tubular shaft 186 projects from the first end 180 and has a hollow bore extending therethrough. The bore also extends through the tubular portion of the intermediate housing 182. A pair of guide fingers 188 project from the first end 180 concentrically about the shaft 186 and engage recesses formed in the central member 174 in the dimmer ring 166 to key the orientation of the intermediate housing 182 to the dimmer ring 166. Lock projections 190 are formed on the exterior surface of each guide finger 188 and snap around one end of the central member 174 in the dimmer ring 166 to secure the intermediate housing 182 to the dimmer ring 166.

The detent surface 180 which is formed with a series of circumferentially spaced projections provides discrete tactile positions for the dimmer ring 166 to control the intensity of the instrument panel lamp(s) as described above.

A guide rail 192 is formed on the exterior of the tubular portion of the intermediate housing 182. The guide rail 192 engages a slot in an end cap as described above.

Figure 7:
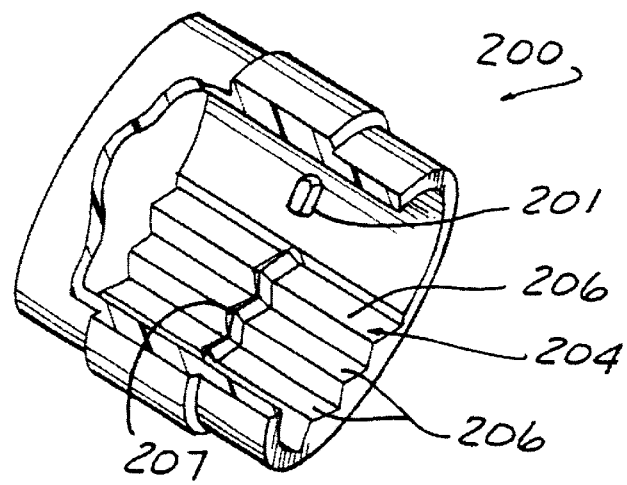
FIG. 7 is a longitudinal cross sectional view of the detent surfaces in the spacer ring shown in FIG. 3C.
Figure 14:
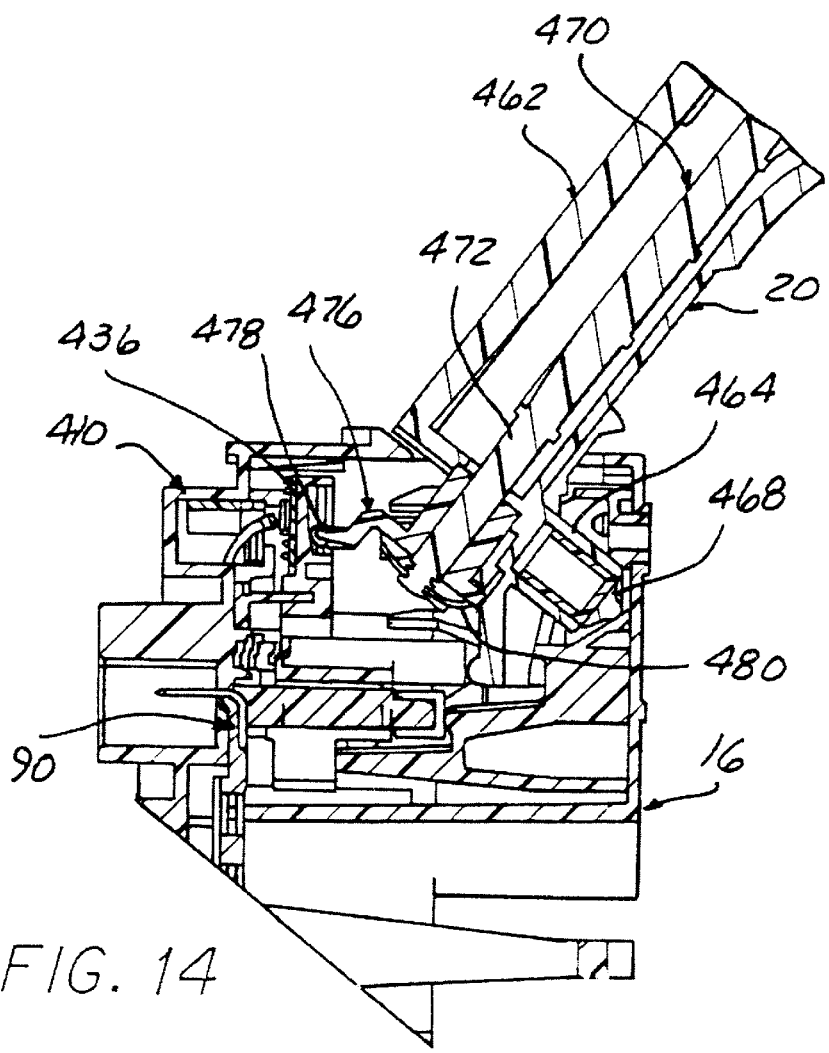
FIG. 14 is a cross-sectional view generally taken along line 14—14 of FIG. 10.

A spacer ring 200, shown in detail in FIGS. 3C and 7 is in the form of a tubular body having an internal through bore which is coaxially mountable over the tubular portion of the intermediate housing 182. Internal projections 201, formed within the bore of the spacer ring 200 engage diametrically opposed apertures 202 in the intermediate housing 182 to fixedly lock the spacer ring 200 to the intermediate housing 182.

A detent surface 204 including three detents 206, by example, is provided on a portion of the interior surface of the bore in the spacer ring 200. Each detent 206 extends substantially along the entire length of the spacer ring 200; but has an intermediate step 207 dividing each detent into two coaxial, but radially offset shown in FIG. 7.

A shaft 210 extends through the joined spacer ring 200 and the intermediate housing 182, the dimmer ring 166 and the lever 142, as shown in FIGS. 3C and 5. The shaft 210 includes a first large diameter shaft portion 212 and a first end portion 214 of a smaller diameter. A flat or other key shaped member 216 is formed at the juncture of the first and second shaft portions 212 and 214 for keyed engagement with a drive gear described hereafter.

The opposite end of the shaft 210 is formed with a transversely extending tubular sleeve 218 having opposed end bores which individually receive a biasing member 220, such as a compression spring, and a movable plunger 222. As can. be seen in FIG. 5, the plungers 222 project diametrically and transversely outward from a longitudinal axis of the shaft 210.

A pair of spaced fingers 230 project coaxially with the longitudinal axis of the shaft 210 from the sleeve 218 and are adapted to engage an interior bore 232 in an end cap 234. The interior bore 232 is formed within a mounting sleeve 236 having a pair of spaced legs 238, each carrying an aperture 240. The apertures 240 align with the bores in the sleeve 218 to secure the end cap 234 to the shaft 210. The aligned apertures 240 in the end cap 234 and the bores in the sleeve 218 allow for insertion of the biasing spring 220 and the plunger 222 therein.

Figures 6A, 6B, 6C, 6D:
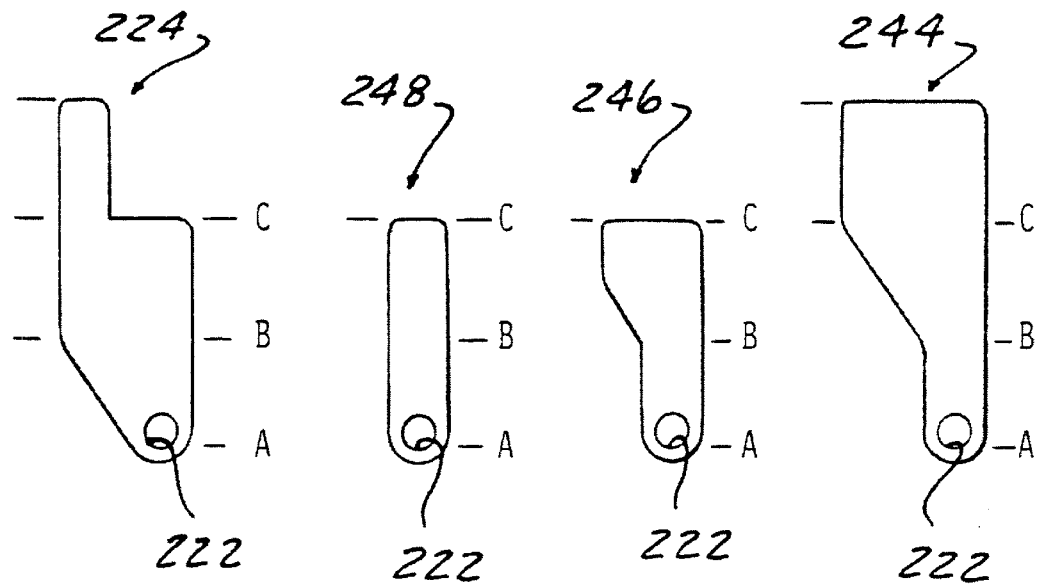
FIGS. 6A, 6B, 6C and 6D are pictorial representations of different cam profiles employed in the headlight/turnsignal stalk switch shown in FIGS. 1 and 3B.

When the dimmer ring 166 is mounted on the shaft 210 and the spacer ring 200 is mounted about the intermediate housing 182, the shaft 210 projects through the aligned bores in the aforementioned components, such that the plungers 222 will be biased outward from the sleeve 218 and ride in a cam profile 224 which allows operation of the fog lights on the vehicle only in certain headlamp operative states. Various configurations of the cam profile 224 may be provided as shown in FIGS. 6A, 6B, 6C and 6D. The cam profile 224 shown in FIG. 6A depicts the various positions of one of the plungers 222 in the cam profile 224.

Since the end cap 234 is securely coupled to the shaft 210, the end cap 234 is freely rotatable relative to the lever 142, the dimmer ring 166, the intermediate housing 182 and the spacer ring 200. Rotation of the end cap 234 and the shaft 210 about the longitudinal axis of the shaft 210 moves one of the plungers 222 across the detents 206 in the detent surface 204 in the spacer ring 200. Three detent positions are defined as shown in FIG. 7, respectively defining headlamp "off", "park" and "on" or "low beam" light operative states. Further, the end cap 234 and the shaft 210, as well as the drive gear coupled to the second diameter end portion 214 of the shaft 210 are capable of longitudinal movement with respect to the lever 142, the intermediate housing 182 and the spacer ring 200. This longitudinal movement is controlled by the cam profile 224. Only in certain rotated positions of the end cap 234 as defined by the detents 206 in the spacer ring 200, is the plunger 222 capable of longitudinal movement axially outward from the lever 142 moving the plunger 222 into the stepped portion of the cam profile 224. This position, as described hereafter, provides a connection to the vehicle fog lights enabling activation of the fog lights only when the vehicle headlights are in the "park" and "on" positions as shown for the cam profile 224 in FIG. 6A. Alternate cam profiles 244, 246 and 248 are shown in FIGS. 6B, 6C and 6D, respectively. Each of these cam profiles 244, 246 and 248 provides a different headlamp-fog light relationship. In FIG. 6B, the cam profile 244 allows the plunger 222, the shaft 210, and the end cap 234 to be pulled axially outward only when the vehicle headlights as defined by the rotated position of the end cap 234 are in the "on" position. From this front fog lights "on" position, the end cap 234 may be further rotated to turn on the rear fog lights.

The cam profile 246 in FIG. 6C allows activation of the vehicle front fog lights only when the vehicle headlights are "on". The cam profile 248 in FIG. 6D is a cam profile for a vehicle which does not have front or rear fog lights.

As shown in FIGS. 3C and 5A, the second smaller diameter end portion 214 of the shaft 210 is slidable through a bore 250 formed in a sleeve 252 of a drive gear 254. The internal bore 250 in the sleeve 252 includes key slots alignable with the key members 216 on the shaft 210 to key the angular position of the gear 254 to the shaft 210.

The drive gear 254 includes a collar 256 shown in the form of a sectorshaped projection. A plurality of gear teeth 258 project angularly from the end of the projection 256. By way of example only, each gear tooth 258 has an elongated stem terminating in a spherical end portion as described in greater detail in U. S. Pat. No. 5,259,262, the entire contents of which are incorporated herein by reference.

The gear teeth 258 on the drive gear 254 engage a linear rack 262, shown in FIG. 3B, in the form of a linear arrangement of spaced recesses formed on a carrier 264. An actuator post 266, the purpose of which will be described hereafter, projects outwardly and upwardly from one side of the carrier 264.

An electrically conductive terminal grid 268 is fixedly mounted, such as by heat staking, to the bottom surface of the carrier 264. The terminal grid 268 includes a plurality, preferably three, leaf contacts 270. The leaf contacts 270 slide along the various conductive traces in the headlamp contact grid 38 seen in FIG. 4, which are mounted on the bottom wall 32 of the back housing 30 as described above. These traces are connected to terminals on the back surface of the housing to provide power to the various headlamp operating circuits depending upon the mode of operation of the headlamp/turnsignal lever 18.

A three point electrical contact 272 is movably mounted on one end of the carrier 268 and normally biased outwardly from the carrier 268 by a biasing compression spring 274. The three point contact 272 controls actuation of the vehicle park lamps when the end cap 234 is rotated to the park lamp "on" position.

A side contact 276 is also mounted on the carrier 264. The side contact 276 is held normally open by the center leg portion 130 of the fog lamp lever 126 when the shaft 210 and end cap 234 are in the normal operating position; but activates the vehicle fog lights when moved to the closed position on axially outward movement of the end cap 234 and shaft 210 as described above. This movement removes the pivoting force on the fog lamp lever 126 allowing the lever 126 to pivot closing the contact 276 with one of the contact 270 to complete a circuit through the contact grid 38 to activate the vehicle fog lamps.

Adjacent to the linear rack carrier 264 in the first major cavity 36 of the back housing 14, is a beam change grid assembly 278 which is mounted by means of terminals 280 depending from a housing 282 carrying the operative components of the beam change assembly, which terminals 280 engage apertures formed in the bottom wall 32 of the back housing 14.

A beam change carrier 284 is pivotally mounted in the housing 282.

The beam change carrier 284 includes a pair of depending legs which latchingly engage receivers 288 formed in the housing 282. Return springs 290 are mounted between the legs 286 and the bottom end of the receivers 288 for biasing the beam change carrier 284 to an opposite pivoted position depending upon which spring 290 is compressed. A pivotal toggle switch 292 is pivotally mounted in the beam change carrier 284 on a centrally located transversely extending post. Toggle switch 292, when the beam change carrier 284 is biasingly mounted in the housing 282, has a pointed end adapted to engage a beam change actuator 294. The actuator 294 includes a pair of detents 296. A beam change contact 298 is biasingly mounted by means of a spring 300 to one side of the beam change actuator 294 and is positioned to engage a contact grid 302 insert molded or heat staked to the housing 282. A headlamp contact 304 is fixedly mounted at one end to the beam change grid housing 282 and has an opposite contact end spaced from a contact pad on the grid 302 exposed to a back wall of the housing 282. The contact pad on the contact 304 is normally spaced from the grid 302. However, the contact 304 will contact the contact pad on the grid 302 when the end cap 234 is rotated to the park position wherein the projection 266 on the linear rack carrier 264 will slide past the contact 304 moving the free end of the contact 304 into contact with the grid 302 on the beam change grid housing 282.

A spring biased plunger assembly 285 is mounted in the housing 282 and extends outward into contact with a two position detent surface 295 formed on the actuator 294. The plunger 285 serves to retain the actuator 294, which is rotatably mounted about post 281 on the housing 282, in one of the two detent positions defined by the two detents 295. However, forced movement of the toggle switch 292 through pivotal movement of the lever 18 toward the driver causes the paddle 146 to engage the upper surface of the beam change carrier 284 resulting in a pivotal movement of the beam change carrier 284 in an opposite direction from its then current position. This rotates the toggle switch 292 causing driven rotation of the actuator 294 to the opposite position. Rotation of the actuator 294 causes a rotation of the beam change contact 298 bringing the contacts 298 into contact with other conductive traces 302 resulting in output signals through the terminals 280 to activate or deactivate the vehicle high beam headlights.

The paddle 146 on the lever 142 engages the top wall of the beam change carrier 284 when the lever 142 is pulled toward the driver from its normal position. This movement forces the beam change carrier 284 to assume an opposite pivoted position wherein the toggle switch 292 is forced over the detents 296 causing the actuator 294 to rotate thereby changing the connections between the ball contacts on the beam change contact 298 and the conductive traces on the grid 302. When it is desired to turn to normal low beam headlights, the lever 142 is again pivoted toward the driver causing a reverse action and opposite rotation of the actuator 294 to return the contact 298 to connection with the traces on the grid 302 associated with low beam headlights.

A pair of flash-to-pass contacts 304 are biased outward from a side wall of beam change carrier 284 by means of biasing springs 306.

Figure 8:
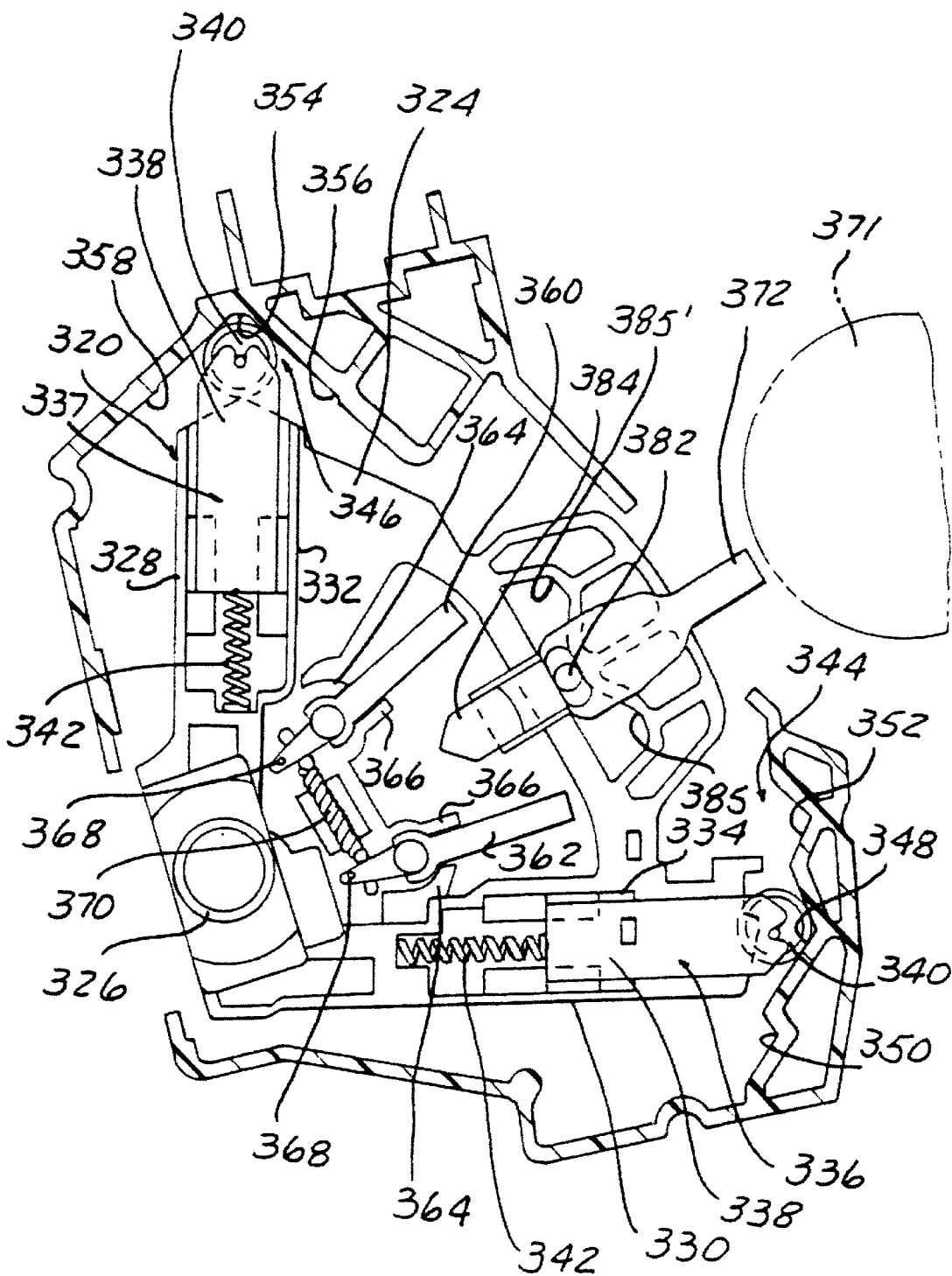
FIG. 8 is a bottom elevational view of the turnsignal carrier shown in the center position.
Figure 9:
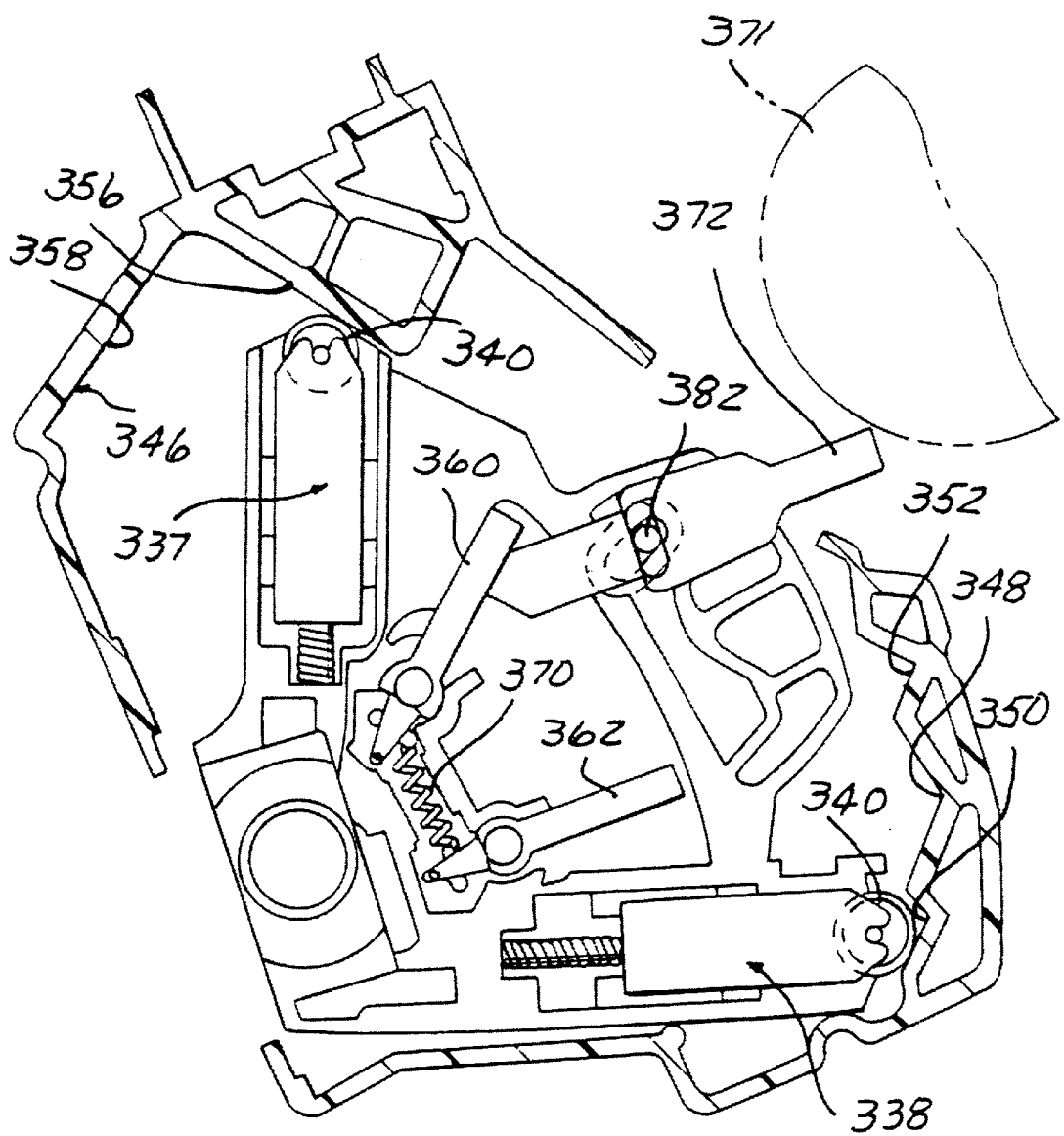
FIG. 9 is a bottom elevational view of the turnsignal carrier in a left hand turn position.

Referring now to FIGS. 8 and 9, there is depicted the turnsignal mechanism actuated by rotational movement of the lever 18 about an axis extending through the sleeve 141 shown in FIG. 1. The turnsignal mechanism includes the turnsignal carrier 320 which is rotatably mounted on the turn carrier base 110 by means of a pair of legs 322 which depend from a wall 324. The legs 322 rotatably engage the support wall 116 and arcuate walls 114 as described above and shown in FIG. 3A for bidirectional pivotal movement relative to the turn carrier base 110. A sleeve 326 projects from an opposite side of the wall 324 between the depending legs 322. The sleeve 326 receives the lever plunger 136 and biasing spring which extend through the sleeve 141 at one end of the lever housing 142 to form a pivot allowing bidirectional rotation of the lever 18 and the turnsignal carrier 320 relative to an axis extending through the front cover 16 in which the lever plunger 324 is seated.

The wall 324 has a pie or sector shape formed of a pair of side walls 328 and 330 which project angularly from the sleeve 326. A pair of inboard walls are respectively mounted on the wall 324 and spaced from the side walls 328 and 330, respectively, to form an opening or slot therebetween, each receiving an individual roller plunger assembly 336 and 337, respectively. The roller plunger assembly 336 is referred to as a "latching plunger"; while the roller plunger assembly 337 is referred to as a "return plunger".

Each roller plunger assembly 336 and 337 includes a generally solid plunger body 338 carrying a roller 340 at an outer end. The plunger 338 is biased outwardly from each slot by a biasing member 342, such as a coil spring.

The inside surface of the front cover 16 is formed with first and second cam surfaces 344 and 346, respectively, which oppose the rollers 340 on the roller plunger assemblies 336 and 337, respectively. The first cam surface 344 is formed with three detents, including a center or neutral detent 348, a left turn detent 350 and a right turn detent 352. The turnsignal carrier 320 is normally situated so that the latching plunger 336 has the roller 340 disposed in the center or neutral detent 248. However, upon pivotal movement of the lever 18 in a left turn direction or a right turn direction, the latching plunger 336 will ride along the cam surface to either side of the center detent 348 causing a compression of the spring 342 and allowing the roller 340 to traverse the first cam surface 344 until it seats in either the left turn detent 350 or the right turn detent 352.

Coincident with pivotal movement of the turnsignal carrier 320 in either direction about the pivot axis extending through the sleeve 326, the return plunger 337 will have its roller 340 traverse the second cam surface 346 from a center or neutral detent 354. The second cam surface 346 is formed with first and second cam irregularities 256 and 358 which are intermediately disposed along the length of each portion of the second cam surface 346. The first and second cam detents or irregularities 356 and 358 provide a tactile feel to the user prior to the latch plunger 336 fully engaging one of the left turn or right turn detents 350 and 352. However, when the turnsignal carrier 320 has been rotated to a position where the roller 340 on the return plunger 337 contacts one of the irregularities 356 and 358, the selected turnsignal lights will be turned on as described hereafter. However, the biasing spring 342 will bias the return plunger 337 toward the center neutral detent 354 thereby forcing the turnsignal carrier 320 back to the center position deactivating the turnsignal lights as soon as the user releases the pivotal force on the lever 18. This enables a driver to briefly flash the left turn or right turn signal lights without fully engaging the latch plunger 336 in the left turn or right turn detents 350 and 352.

As shown in FIGS. 8 and 9, a pair of cancel members 360 and 362 are mounted on the wall 324. The cancel members 360 and 362 have an identical shape. According to a unique feature of the present invention, each cancel member 360 and 362 is pivotally mounted on the wall 324 between spaced wall portions 364 and 366 formed on the wall 324. An end portion of each cancel member 360 and 362 is pivotally attached to the wall 324 by means of a pivot pin 368 which has an enlarged end disposed on an opposite surface of the wall 324 to mount the cancel members 360 and 362 on the wall 324 while allowing pivotal movement of the cancel members 360 and 362. A biasing member, such as a spring 370, is mounted between a pair of ribs on the wall 324 and acts to bias the cancel members 360 and 362 to a neutral position shown in FIG. 8.

A cancel cam 371, typically mounted on the vehicle steering wheel, not shown, engages a cancel pawl 372 upon rotation of the steering wheel in a direction counter to the turn direction. The cancel pawl 372 has an arm portion projecting outwardly from a center portion of the wall 324. The cancel pawl 372 projects outwardly through an opening or discontinuity 376, shown in FIG. 1, in the front cover 16.

A pin 378 projects upwardly from the center portion of the cancel pawl 372 and rides within a slot 380, shown in FIG. 1 in the top wall of the front cover 16 to control translation of the cancel pawl 372. An oppositely extending pin 382 projects from a bottom portion of the intermediate portion of the cancel pawl 372 and rides within a recess shown in FIG. 8 between a center portion and two opposed detent portions 385' and 385 which correspond to fully latched left turn and right turn positions of the latch plunger 336. The opposite end of the cancel pawl 372 from the arm 376 is formed with a block-shaped member 384. An inner edge of the block-shaped member 384 is spaced from the post 378. A return piston and a biasing spring are interposed between one end of a recess in the front cover 16 and the post 378 and act on the post 378 of the cancel pawl 372 to bias the cancel pawl 372 to a center position while permitting pivotal movement of the cancel pawl 372 about the post 378.

As shown in FIG. 8, in a normal non-turnsignal operating condition, the cancel pawl 372 is in a centered position spaced from each from of the cancel members 360 and 362. However, when the turnsignal carrier 320 is pivoted into a left turn or right turnsignaling position, the block member 384 on the cancel pawl 372 will be disposed adjacent to one of the cancel members 360 and 362 as shown in FIG. 9.

As a driver normally releases the turnsignal lever 18 signal after fully engaging the lever 18 in a left turn or right turnsignaling position, sufficient rotation of the steering wheel while making a left hand or right hand turn will rotate the cancel cam 371 a sufficient amount to pivot the cancel pawl 372 thereby urging the adjacent cancel member 360 or 362 in a direction to unlatch the latching plunger 336 from the left hand or right hand detent position 350 and 352 and to return the turnsignal carrier 322 to the normal centered position shown in FIG. 8.

However, a condition can arise where the driver maintains a force on the lever 18 associated with a left hand or right hand turn while making the turn. This could create a jam between one of the cancel members 360 and 362 and the cancel pawl 372 creating the potential for breakage of these relatively small components.

According to the present invention, the unique provision of the biasing spring 370 and making the cancel members 360 and 362 pivotal as well as providing the biasing piston 386 and biasing piston spring 388 enables the cancel member 360 or 362 immediately adjacent the cancel pawl 372 in a turn position shown in FIG. 9, to pivot out of the way of the block-shaped member 384 on the cancel pawl thereby enabling the cancel pawl 372 to pass by the cancel member 360 or 362 without breakage of either component. The biasing spring 370 ensures that the cancel members 360 and 362 are biased to their normal position shown in FIG. 8 after release of force on the lever 18.

Finally, as shown in FIG. 3A, an arm 388 having an internal bore, not shown, is mounted along one side wall 328 of the turnsignal carrier 320. The arm 388 depends downwardly from the wall 328 of the turnsignal carrier 320 and receives a biasing spring 390 and an electrical contact 392 which is preferably in the form of a three point contact as shown in FIG. 3A. In the operative mounting position of the turnsignal carrier 320 in the turn carrier base 110, the contact 392 is positioned over the contact grid 90 on the grid assembly 88, shown in FIGS. 3A and 10, disposed on an upper portion of the grid assembly 88. For convenience, the conductive traces in the contact grid 90 are connected through the leads 91 to terminals on the right hand end of the grid assembly 88 for connection to a turnsignal cable connector, not shown.

Referring now to FIGS. 10–14, there is depicted the detailed construction of the windshield wiper/wash/mist lever 20. As described above, the grid assembly 88 which is mounted in the back housing 14 has an upstanding post 98 on one end portion of the grid assembly.

Starting on the left end of the FIG. 10, the lever 20 includes a wash/mist actuator 410 including a hollow, tubular post 412 which is rotatably mountable over the post 98 on one end of the grid assembly 88. A second, shorter, hollow, tubular sleeve 414 is also integrally mounted on the wash/mist actuator 410 adjacent to the post 412. A generally elongated, diamond-shaped tubular member 416 is also integrally formed adjacent to the post 412 and extends upward therefrom as a centering member.

An arm 418 projects radially outward and then arcuately from the post 412. The arm 418 terminates in a depending flange 420 which is positioned to be slidably disposed between the first and second leaf contacts 94 and 95 on the second contact grid 93 of the grid assembly 88 as shown in FIG. 13. The arm 418 also, when the post 412 is mounted on the post 98 of the grid assembly 88, is positioned to ride beneath an annular flange 422 formed on the housing of the grid assembly 88. Further, the end of the arm 418 engages the elongated end of the center leaf contact 95.

Rotation of the lever 20 in a generally downward direction with respect to the normal mounting orientation of the lever 20 on the vehicle steering column causes the lever 20 to pivot about the wiper carrier pivot 448 resulting in rotation of the wash/mist actuator 410 in a direction to separate the arm 418 from contact with the center leaf contact 95 on the grid assembly 88. This enables the center leaf contact 95 to spring into contact with the center conductive trace 430 on the radial printed circuit board 426 to complete a circuit.

It should also be noted that the post 412 is also mounted for transverse movement along the post 98 thereby enabling the entire wash/mist actuator 410 to translate along the post 98 in response to pivotal movement of the lever 20 as described hereafter.

As noted above, the printed circuit board 426 has an arcuate shape and carries three conductive traces 428, 430 and 432. It should be noted that the radially outermost trace 432 is formed of a number of resistors.

Figure 16:
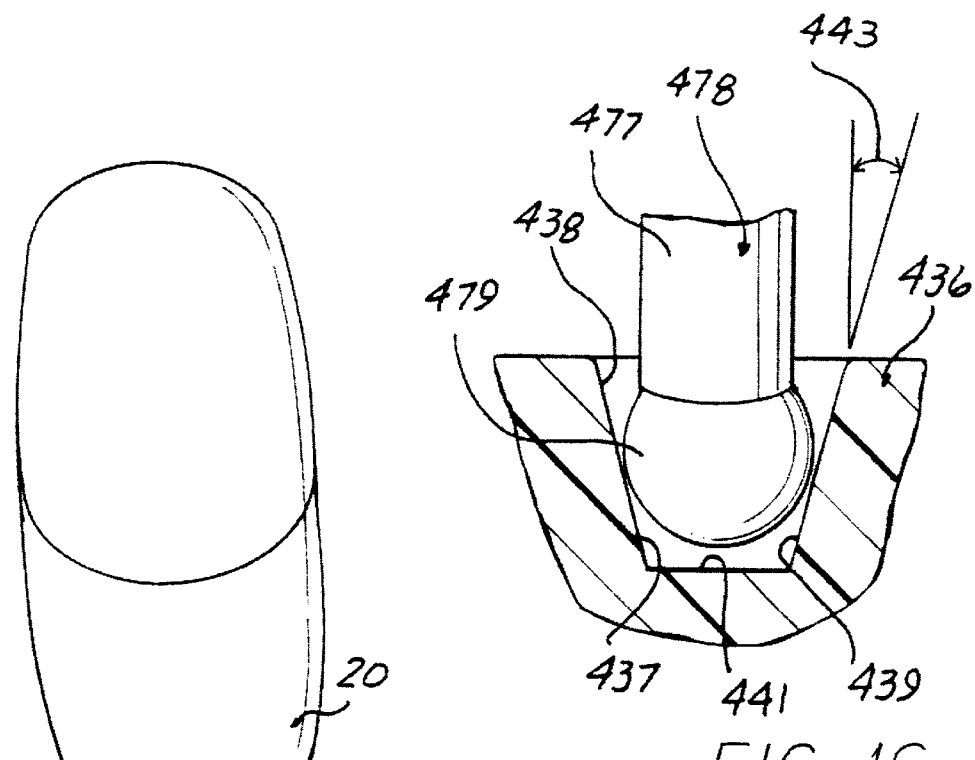
FIG. 16 is an enlarged, partial view of the gear pair shown in FIG. 15.
Figure 15:
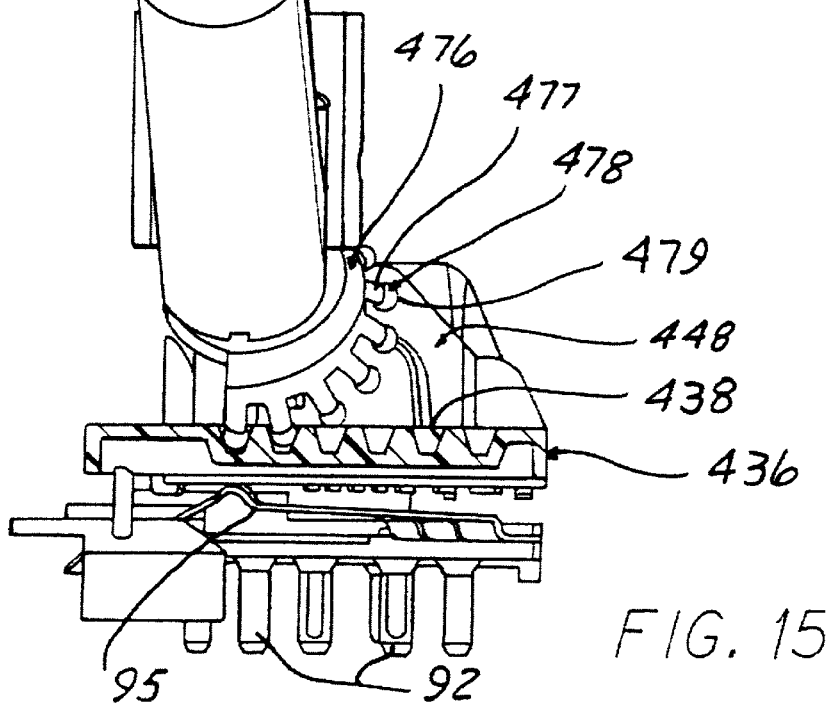
FIG. 15 is a partially cross-sectioned, side elevational view of the wiper switch lever of FIG. 10.

The printed circuit board 426 is mounted on a radial rack 436 which includes a plurality of arcuately disposed tooth receiving recesses 438 which are molded as part of a carrier or body. As shown in FIGS. 15 and 16, each recess bore 38 in the radial rack 436 has a straight line profile formed of opposed faces 437 and 439 which project from a bottom land 441. The faces 439 of each recess 438 are disposed at a predetermined pressure angle 443, such as 10° by example. It will be understood that the profile of each recess 438 and the radial rack 436 may take any other form, such as a conventional involute gear toothed end space form.

An arm 440 projects outward from one end of the radial rack 436 and terminates in a tubular sleeve 442 having a through bore extending therethrough which is designed to rotatably fit over the upper end of the post 98 on the grid assembly 88 above the wash/mist actuator 410 as shown in FIG. 11. A stop rib 444 projects from a back surface of the radial rack 436 and acts as a rotation stop to limit rotation of the radial rack 436 in one direction. Rotation of the radial rack 436 in an opposite direction is limited by contact between the outer end of the radial rack 436 and an interior shoulder formed in the back housing 14.

Figure 3D:
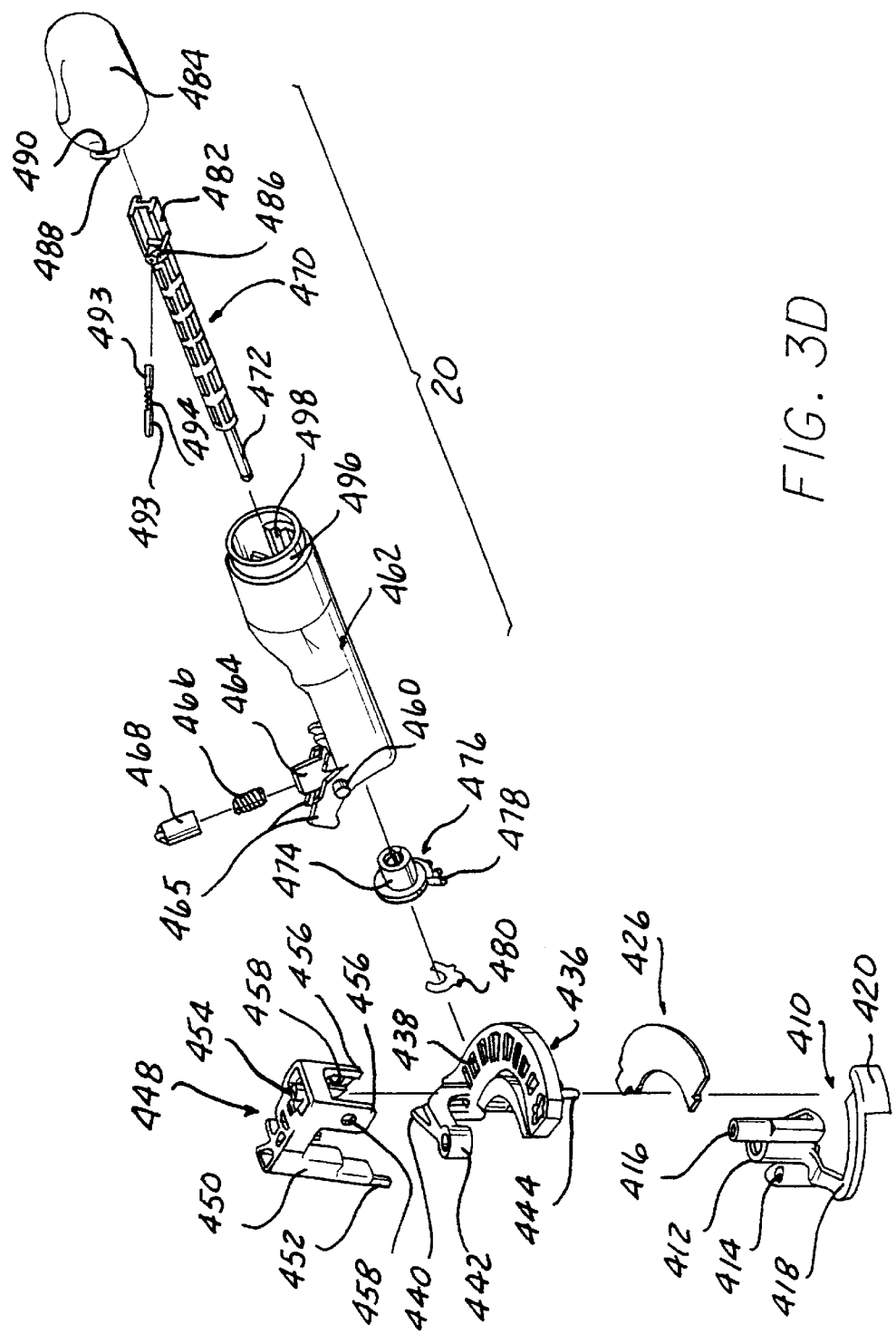
FIG. 3D is an exploded perspective view of the wiper stalk switch lever shown in FIG. 1.

Next, a wiper carrier pivot 448, shown in FIG. 3D, is provided in the form of a one-piece, unitary, molded plastic body. The wiper carrier pivot 448 has a tubular end 450 having a pin 452 of irregular shape which is complementary to the shape of the bore in the sleeve 414 on the wash/mist actuator 410. Preferably, the bore in the sleeve 414 and the cross section of the post 452 has a generally triangular cross section so as to enable the wash carrier pivot 448 to be mounted in only one orientation in the sleeve 414.

The wiper carrier pivot 448 also includes a mounting portion carrying a tubular, hollow pivot sleeve 454 and a pair of depending mounting legs 456 each having an aperture 458 therein. The sleeve 454 fits within an aperture 455 formed in the front cover 16 as shown in FIG. 3C to pivotally mount the wiper carrier pivot 448 to the front cover 16.

The mounting legs 456 and apertures 458 are alignable with a pair of transversely extending trunnions 460, only one of which is shown in FIG. 36, which trunnions are formed on one end of a wiper lever 462. The trunnions 460 are generally adjacent to the tubular sleeve 464 which receives a lever plunger return spring 466 and a lever plunger 468. The lever plunger 468 biasingly seats within a bore formed on the underside of the wiper carrier pivot 448 such that the lever plunger return spring 466 biases the wiper lever 462 to a normal position and will automatically return the wiper lever 462 to the normal position after force on the lever 18 pulling the lever 18 toward the driver to actuate a windshield wash and wiper operation is released.

Further, a pair of arms 465 are formed at one end of the wiper lever 462. With the wiper lever 462 rotatably mounted via the trunnions 460 in the mounting apertures 458 of the mounting legs 456 of the wiper carrier pivot 448, the arms 465 will be disposed interiorly underneath the wiper carrier pivot 448 in a position overlaying and trapping the sleeve 416 between the two arms 465. In this manner, rotation of the wiper lever assembly 20 in a generally downward direction with respect to a normal mounting position on a vehicle steering column results in the aforementioned rotation of the wash/mist actuator 410 to actuate the vehicle windshield washer pump to spray windshield washer fluid onto the vehicle windshield. A return spring 466 is mounted in a recess in the front cover 16 and acts on one of the arms 465 to bias the wiper lever 462 back to the normal, centered position.

A wiper shaft 470 has a tubular shaft section terminating in a reduced diameter first end 472. As shown in FIG. 3C, the first end 472 slides through an opening at one end of the wiper lever 462 and through a sleeve 474 on a wiper gear 476. The wiper gear 476 is similar to the headlamp gear 254 in that an enlarged disk is mounted at one end of the sleeve 474 and has a plurality of teeth 478, each formed of a stem 477 and spherical end portion 479, by example only, extending at least along a predetermined arc or sector thereof. The spherical ends 479 of the teeth 478 engage the recesses 438 in the radial rack 436 and are capable of radial sliding movement upon pivotal movement of the lever 20 along certain axes as well as rotation to drive the radial rack 436. A retainer, such as a wave clip 480, is mounted about the end of the first end portion 472 of the wiper shaft 470 to secure the wiper shaft 470 to the wiper gear 476. As the sleeve 474 of the wiper gear 476 rotatably seats within a shoulder at one end of the wiper lever 462, the wiper shaft 470, the wiper gear 476 and the wiper lever 462 are joined together as an integral structure for pivotal and rotary movement as described hereafter.

It is conventional to provide backlash in a mating gear pair. Backlash is defined as the amount by which the tooth space of one gear exceeds the tooth thickness of the mating gear at the pitch circle of the gears. However, according to a unique aspect of the present invention, the drive gear 476 and the recesses or teeth 438 on the radial rack 436 are designed with zero backlash. As shown in FIG. 16, the diameter or tooth width of each tooth 478 on the drive gear 476, at the pitch circle of each tooth formed between adjacent recesses 438 in the radial rack 436 is designed to be substantially the same as the tooth space between adjacent faces 437 and 439 forming one recess 438 in the radial rack 436. This provide better timing accuracy for the wiper operation particularly with a multi-axially oriented stalk lever gear pair 436, 476 where the drive gear 476 rotates on one rotational axis for a wiper drive operation, moves about another rotational axis for a windshield wash operation, and operates along yet another rotational axis for a missed wiper operation.

According to another aspect of the present invention, the radial rack 436 is provided with some flexibility along its rotational axis in order to reduce friction and wear between the contact of the drive gear teeth 478 and the recesses or tooth spaces 438 in the radial rack 436 when the drive gear 476 is rotated. This flexibility is provided by the slide on mounting of the sleeve 442 over the post 98 on the grid assembly 88, as described above, as well as preload or biasing force exerted on the radial rack 436 by the leaf contacts 94, 95 and 96, one of which is shown in FIG. 15. As described above, each of the leaf contacts 94, 95, 96, such as the illustrated leaf contact 95, cantilevers from one end of the conductive traces or conductive elements in the grid assembly 88. The end of the leaf contact 95 is resiliently biased toward the conductive traces on the bottom surface of the radial rack 436, as also described above. This resilient or biasing force normally biases the radial rack 436 axially along the post 98 into firm contact with the teeth 478 of the drive gear 476.

The opposite end of the wiper shaft 470 is formed in a key-shaped end 482 having a generally l-shape which fits within a complementary shaped recess in a wiper cap 484. A pair of oppositely extending hollow sleeves 486 project from the wiper shaft 470 adjacent to the key end 482. The sleeves 486 are alignable with a pair of mounting legs 488, only one of which is shown in FIG. 3D. A plunger and spring assembly formed of two oppositely extending plungers 492 and 493 biased outwardly by a spring 494 extends through the aligned bores in the sleeves 486 with the outer ends of the plungers 492 and 493 extending through the apertures 490 in the mounting legs 488 of the wiper cap 484 to unitarily join the wiper cap 484 to the wiper shaft 470. A reduced diameter shoulder 496 on one end of the wiper lever 462 seats within the open end of the wiper cap 484 and provides a bearing surface for rotation of the wiper cap 484 relative to the wiper lever 462.

At least one of the plungers 492 and 393 extending outwardly through the apertures 490 in the mounting legs 488 of the wiper cap 484 engage a detent surface 498 formed on the interior of the one end of the wiper lever 462 which defines a series of spaced, discrete, positions of the wiper cap 484 relative to the wiper lever 462. Each discrete position represents a different amount of arcuate movement of the radial rack 436 and rotation of the wiper cap 484 to connect more or less of the resistors on the outer conductive trace 432 on the printed circuit board 426 in a wiper speed circuit for an intermittent wiper control operation.

From the above description, it can be seen that the wiper lever assembly 20 functions to control windshield wiper speed via rotation of the wiper cap 484 through a plurality of discrete positions defined by the detent surface 498, and a windshield mist operation via downward rotation of the lever assembly 20 relative to the normal position of the front cover 14 on a vehicle steering column which activates the wiper drive for one cycle and a simultaneous rotation of the vehicle windshield wipers. Finally, pivotal movement of the lever assembly 20 toward the driver results in a downward movement on the wash/mist actuator 410 causing the lower end of the center member 416 to engage and depress a leaf contact 500 pivotally carried on the grid assembly 88 into contact with an underlying conductive trace of the grid assembly 88. This controls the wiper drive to operate the vehicle wipers for one cycle.

What is claimed is:

1. A steering column stalk switch comprises:
   a housing mountable on a steering column;
   a lever mounted on the housing;
   a first contactor mounted in the housing for movement between contact positions and carrying contacts selectively connectable in the contact positions to first conductive elements electrically connected to a first set of vehicle operating circuits;
   a first actuator rotatably mounted on the lever for movement independent of the lever;
   a second contactor mounted in the housing, the second contactor selectively movable into contact with second conductive elements carried in the housing for controlling the operation of a second vehicle operating circuit;
   a first cam carried on the lever defining the positions of the first actuator in which the first actuator is movable from a first actuator position to a second actuator position;
   a second cam formed to allow the axial translation of the first actuator from a first axial position to a second axial position with respect to the lever when the first actuator is in a predetermined actuator position; and a cam follower carried with the first actuator, the cam follower movable along the first and second cams.

2. The steering column stalk switch of claim 1 wherein:

the first actuator is an end cap movably coupled to the lever for rotation; and a shaft extending through the lever and having first and second ends, the first end fixed to the end cap and the second end engagably coupled to the first contactor for controlling the first set of vehicle operating circuits such that rotation of the end cap and the shaft causes movement of the first contactor between contact positions.

3. The steering column stalk switch of claim 2 wherein:

the end cap is rotatable from a first actuator position corresponding to a first state of the first set of vehicle operating circuits to a second actuator position corresponding to a second state of the first set of vehicle operating circuits and to a third actuator position corresponding to a third state of the first set of the vehicle operating circuits; and the second cam formed to allow the axial translation of the end cap with respect to the lever in at least the second actuator position of the end cap.

4. The steering column stalk switch of claim 3 wherein: the second cam is formed to allow the axial translation of the end cap with respect to the lever in only the third actuator position of the end cap.

5. The steering column stalk switch of claim 3 wherein:

the second cam is formed to allow rotation of the end cap relative to the lever in only one axially translated actuator position of the end cap.

6. The steering column stalk switch of claim 5 wherein the second contactor is positioned to activate vehicle rear fog lights upon rotation of the end cap in only one axially translated actuator position.

7. The steering column stalk switch of claim 3 wherein:

the cam is formed to allow the axial translation of the end cap with respect to the lever in only the second and third actuator positions of the end cap.

8. The steering column stalk switch of claim 2 further comprising:

the second contactor engaged by the second end of the shaft only upon the axial translation of the shaft and the end cap.

9. The steering column stalk switch of claim 2 wherein the first cam comprises a tubular member mounted over the shaft concentric with the lever, within which tubular member is formed a detent surface having a plurality of detents;

the end cap is fixedly connected to the shaft for rotating the shaft; and the cam follower comprises at least one plunger carried on the shaft and rotatably engagable with the detent surface on the tubular member during rotation of the shaft to define a plurality of distinct actuator positions of the end cap with respect to the lever.

10. The steering column stalk switch of claim 9 wherein:

the plurality of detents extend axially along an inner surface of the tubular member; and a radially extending step formed in each of the detents.

11. The steering column stalk switch of claim 1 wherein the first set of vehicle operating circuits comprise:

a first off position of a vehicle headlight, a second operating position in which the low beam vehicle headlights are activated, and a third operating position in which the high beam vehicle headlights are activated.

12. A steering column stalk switch comprising:

a housing mountable on a steering column;

a lever mounted on the housing;

a first contactor mounted in the housing for movement between contact positions and carrying contacts selectively connectable in the contact positions to first conductive elements electrically connected to a first set of vehicle operating circuits;

an end cap movably coupled to the lever for rotation independent of the lever, wherein the end cap is rotatable from a first actuator position corresponding to a first state of the first set of vehicle operating circuits to a second actuator position corresponding to a second state of the first set of vehicle operating circuits and to a third actuator position corresponding to a third state of the first set of vehicle operating circuits;

a shaft extending through the lever and having first and second ends, the first end fixed to the end cap and the second end engagably coupled to the first contactor for controlling the first set of vehicle operating circuits such that rotation of the end cap and the shaft causes movement of the first contactor between contact positions;

a second contactor mounted in the housing, the second contactor selectively movable into contact with second conductive elements carried in the housing for controlling the operation of a second vehicle operating circuit;

a cam carried on the lever defining the positions of the first actuator in which the end cap is movable from a first actuator position to a second actuator position; and a cam follower carried on the shaft and movable along the cam, wherein the cam is formed to allow the axial translation of the end cap with respect to the lever in only the second and third actuator positions of the end cap.

13. A steering column stalk switch comprising:

a housing mountable on a steering column;

a lever mounted on the housing;

a first contactor mounted in the housing for movement between contact positions and carrying contacts selectively connectable in the contact positions to first conductive elements electrically connected to a first set of vehicle operating circuits, wherein the first set of vehicle operating circuits include:

a first off position of a vehicle headlight, a second operating position in which the low beam vehicle headlights are activated, and a third operating position in which the high beam vehicle headlights are activated;

a first actuator rotatably mounted on the lever for movement independent of the lever;

a second contactor mounted in the housing, the second contactor selectively movable into contact with second conductive elements carried in the housing for controlling the operation of a second vehicle operating circuit; and means, cooperating between the first actuator and the second contactor, for permitting movement of the second contactor from a first position to a second position only in predetermined actuator positions of the first actuator.

14. A steering column stalk switch comprising:

a housing mountable on a steering column;

a lever mounted on the housing;

a first contactor mounted in the housing for movement between contact positions and carrying contacts selectively connectable in the contact positions to first conductive elements electrically connected to a first set of vehicle operating circuits;

an end cap movably coupled to the lever for rotation independent of the lever, wherein the end cap is rotatable from a first actuator position corresponding to a first state of the first set of vehicle operating circuits to a second actuator position corresponding to a second state of the first set of vehicle operating circuits and to a third actuator position corresponding to a third state of the first set of the vehicle operating circuits;

a second contactor mounted in the housing, the second contactor selectively movable into contact with second conductive elements carried in the housing for controlling the operation of a second vehicle operating circuit, wherein the second contactor is positioned to activate vehicle rear fog lights upon rotation of the end cap in only one axially translated actuator position;

a cam carried on the lever defining the positions of the first actuator in which the end cap is movable from a first actuator position to a second actuator position; and a cam follower carried on the shaft and movable along the cam, the cam formed to allow the axial translation of the end cap with respect to the lever in only one axially translated actuator position of the end cap.

15. A steering column stalk switch comprises:

a housing mountable on a steering column;

a lever mounted on the housing;

a first contactor mounted in the housing for movement between first contact positions and carrying first contacts selectively connectable in the first contact positions to first conductive elements electrically connected to a first set of vehicle operating circuits;

a first actuator rotatably mounted on the lever for movement independent of the lever;

a second contactor mounted in the housing for movement between second contact positions and carrying second contacts selectively connectable in the second contact positions to second conductive elements electrically connected to a second set of vehicle operating circuits, the second contactor selectively movable into contact with the second conductive elements;

means, cooperating between the first actuator and the second contactor, for permitting movement of the second contactor from a first position to a second position only in predetermined actuator positions of the first actuator; and wherein rotation of the first actuator when the second contactor is in the second position moves the second contactor from a first one of the second contact positions to a second one of the second contact positions.

16. The steering column stalk switch of claim 15 wherein one of the second set of vehicle operating circuits comprises:

an operating position in which vehicle rear fog lights are activated.

17. The steering column stalk switch of claim 15 wherein:

the first actuator is an end cap movably coupled to the lever for rotation;

a shaft extending through the lever and having first and second ends, the first end fixed to the end cap and the second end engagably coupled to the first contactor for controlling the first set of vehicle operating circuits such that rotation of the end cap and the shaft causes movement of the first contactor between first contact positions; and the second end selectively coupled to the second contactor for controlling the second set of vehicle operating circuits such that rotation of the end cap and the shaft causes movement of the second contactor between second contact positions.

18. A steering column stalk switch comprising:

a housing mountable on a steering column;

a lever mounted on the housing;

a first contactor mounted in the housing for movement between first contact positions and carrying first contacts selectively connectable in the first contact positions to first conductive elements electrically connected to a first set of vehicle operating circuits;

a first actuator rotatably mounted on the lever for movement independent of the lever;

a second contactor mounted in the housing for movement between second contact positions and carrying second contacts selectively connectable in the second contact positions to second conductive elements electrically connected to a second set of vehicle operating circuits, the second contactor selectively movable into contact with the second conductive elements and wherein the second contactor is positioned to activate the vehicle rear fog lights upon rotation of the first actuator in one axially translated actuator position; and means, cooperating between the first actuator and the second contactor, for permitting movement of the second contactor from a first position to a second position only in predetermined actuator positions of the first actuator.

* * * * *